(12) United States Patent
Tammera

(10) Patent No.: US 9,017,457 B2
(45) Date of Patent: Apr. 28, 2015

(54) APPARATUS AND SYSTEMS HAVING A RECIPROCATING VALVE HEAD ASSEMBLY AND SWING ADSORPTION PROCESSES RELATED THERETO

(75) Inventor: Robert F. Tammera, Warrenton, VA (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 13/996,429

(22) PCT Filed: Feb. 27, 2012

(86) PCT No.: PCT/US2012/026799
§ 371 (c)(1),
(2), (4) Date: Jun. 20, 2013

(87) PCT Pub. No.: WO2012/118757
PCT Pub. Date: Sep. 7, 2012

(65) Prior Publication Data
US 2013/0340619 A1    Dec. 26, 2013

Related U.S. Application Data

(60) Provisional application No. 61/448,120, filed on Mar. 1, 2011.

(51) Int. Cl.
| | | |
|---|---|---|
| B01D 59/26 | (2006.01) |
| F16K 11/00 | (2006.01) |
| B01D 53/04 | (2006.01) |
| F04B 39/10 | (2006.01) |

(Continued)

(52) U.S. Cl.
CPC ............ *F16K 11/00* (2013.01); *B01D 53/0407* (2013.01); *F04B 39/1013* (2013.01); *F16K 1/34* (2013.01); *F16K 1/44* (2013.01)

(58) Field of Classification Search
USPC .................................. 95/96, 103; 96/121, 130
See application file for complete search history.

(56) References Cited

U.S. PATENT DOCUMENTS

| | | | |
|---|---|---|---|
| 1,868,138 A | 7/1932 | Fisk | |
| 2,600,435 A | 6/1952 | Shapiro | 210/131 |

(Continued)

FOREIGN PATENT DOCUMENTS

| | | |
|---|---|---|
| CA | 2 234 924 | 4/1998 |
| CA | 2 224 471 | 6/1998 |

(Continued)

OTHER PUBLICATIONS

U.S. Appl. No. 13/602,750, filed Sep. 4, 2012, Sundaram, N. et al.

(Continued)

*Primary Examiner* — Jason M Greene
*Assistant Examiner* — Dung H Bui
(74) *Attorney, Agent, or Firm* — ExxonMobil Upstream Research Company Law Department

(57) ABSTRACT

Provided are apparatus and systems having a poppet valve assembly and swing adsorption separation techniques related thereto. A poppet valve includes a valve body, a plurality of static valves fixedly secured to the valve body and a single dynamic poppet valve having a plurality of openings. The plurality of static valves align and mate with the plurality of openings. The single dynamic poppet valve reciprocates to selectively open and close the plurality of static valves.

8 Claims, 18 Drawing Sheets

(51) Int. Cl.
*F16K 1/34* (2006.01)
*F16K 1/44* (2006.01)

(56) References Cited

U.S. PATENT DOCUMENTS

| | | | |
|---|---|---|---|
| 3,124,152 A | 3/1964 | Payne | |
| 3,142,547 A | 7/1964 | Marsh et al. | |
| 3,508,758 A | 4/1970 | Strub | |
| 3,602,247 A | 8/1971 | Bunn et al. | |
| 3,788,036 A | 1/1974 | Lee et al. | |
| 3,967,464 A | 7/1976 | Cormier et al. | |
| 4,207,084 A | 6/1980 | Gardner | 55/181 |
| 4,261,815 A | 4/1981 | Kelland | |
| 4,324,565 A | 4/1982 | Benkmann | |
| 4,325,565 A | 4/1982 | Winchell | |
| 4,329,162 A | 5/1982 | Pitcher, Jr. | |
| 4,340,398 A | 7/1982 | Doshi et al. | |
| 4,374,655 A | 2/1983 | Grodzka et al. | 55/163 |
| 4,711,968 A | 12/1987 | Oswald et al. | |
| 4,770,676 A | 9/1988 | Sircar et al. | 55/26 |
| 4,784,672 A | 11/1988 | Sircar | |
| 4,790,272 A | 12/1988 | Woolenweber | |
| 4,816,039 A | 3/1989 | Krishnamurthy et al. | |
| 4,846,211 A | 7/1989 | Scheffler et al. | 137/119 |
| 4,877,429 A | 10/1989 | Hunter | |
| 4,977,745 A | 12/1990 | Heichberger | 62/10 |
| 5,110,328 A | 5/1992 | Yokota et al. | |
| 5,125,934 A | 6/1992 | Krishnamurthy et al. | |
| 5,169,006 A | 12/1992 | Stelzer | |
| 5,174,796 A | 12/1992 | Davis et al. | |
| 5,224,350 A | 7/1993 | Mehra | |
| 5,234,472 A | 8/1993 | Krishnamurthy et al. | |
| 5,286,282 A | 2/1994 | Goodell et al. | 96/113 |
| 5,292,990 A | 3/1994 | Kantner et al. | |
| 5,306,331 A | 4/1994 | Auvil et al. | |
| 5,370,728 A | 12/1994 | LaSala et al. | |
| 5,565,018 A | 10/1996 | Baksh et al. | |
| 5,662,727 A | 9/1997 | Castle et al. | 96/130 |
| 5,700,310 A | 12/1997 | Bowman et al. | |
| 5,750,026 A | 5/1998 | Gadkaree et al. | |
| 5,792,239 A | 8/1998 | Reinhold, III et al. | |
| 5,807,423 A | 9/1998 | Lemcoff et al. | |
| 5,811,616 A | 9/1998 | Holub et al. | |
| 5,827,358 A | 10/1998 | Kulish et al. | |
| 5,833,938 A | 11/1998 | Blazejewski | 422/175 |
| 5,837,205 A | 11/1998 | Bayer et al. | 422/109 |
| 5,871,349 A | 2/1999 | Johnson et al. | 432/180 |
| 5,906,673 A | 5/1999 | Reinhold, III et al. | |
| 5,924,307 A | 7/1999 | Nenov | |
| 5,935,444 A | 8/1999 | Johnson et al. | 201/691 |
| 5,968,234 A | 10/1999 | Midgett, II et al. | |
| 5,976,221 A | 11/1999 | Bowman et al. | |
| 5,997,617 A | 12/1999 | Czabala et al. | |
| 6,007,606 A | 12/1999 | Baksh et al. | |
| 6,011,192 A | 1/2000 | Baker et al. | |
| 6,039,927 A | 3/2000 | Greco | 422/175 |
| 6,053,966 A | 4/2000 | Moreau et al. | |
| 6,063,161 A | 5/2000 | Keefer et al. | |
| 6,086,828 A | 7/2000 | Thompson | 422/173 |
| 6,099,621 A | 8/2000 | Ho | |
| 6,129,139 A | 10/2000 | De Clerc | 165/9.3 |
| 6,129,780 A | 10/2000 | Millet et al. | |
| 6,136,222 A | 10/2000 | Friesen et al. | |
| 6,147,126 A | 11/2000 | DeGeorge et al. | |
| 6,171,371 B1 | 1/2001 | Derive et al. | |
| 6,176,897 B1 | 1/2001 | Keefer | |
| 6,179,900 B1 | 1/2001 | Behling et al. | |
| 6,210,466 B1 | 4/2001 | Whysall et al. | |
| 6,213,758 B1 | 4/2001 | Tesar et al. | 431/12 |
| 6,231,302 B1 | 5/2001 | Bonardi | |
| 6,245,127 B1 | 6/2001 | Kane et al. | |
| 6,261,092 B1 | 7/2001 | Cash | 432/179 |
| 6,284,021 B1 | 9/2001 | Lu et al. | |
| 6,311,719 B1 | 11/2001 | Hill et al. | |
| 6,321,462 B1 | 11/2001 | Seidl et al. | 34/423 |
| 6,336,278 B1 | 1/2002 | Crawford et al. | 34/80 |
| 6,345,954 B1 | 2/2002 | Al-Himyary et al. | |
| 6,398,853 B1 | 6/2002 | Keefer et al. | |
| 6,406,523 B1 | 6/2002 | Connor et al. | |
| 6,436,171 B1 | 8/2002 | Wang et al. | |
| 6,444,012 B1 | 9/2002 | Dolan et al. | |
| 6,444,014 B1 | 9/2002 | Mullhaupt et al. | |
| 6,444,523 B1 | 9/2002 | Fan et al. | |
| 6,451,095 B1 | 9/2002 | Keefer et al. | |
| 6,457,485 B2 | 10/2002 | Hill et al. | |
| 6,471,939 B1 | 10/2002 | Boix et al. | |
| 6,488,747 B1 | 12/2002 | Keefer et al. | |
| 6,497,750 B2 | 12/2002 | Butwell et al. | |
| 6,500,241 B2 | 12/2002 | Reddy | |
| 6,500,404 B1 | 12/2002 | Camblor Fernandez et al. | |
| 6,506,351 B1 | 1/2003 | Jain et al. | |
| 6,517,609 B1 | 2/2003 | Monereau et al. | |
| 6,531,516 B2 | 3/2003 | Davis et al. | |
| 6,533,846 B1 | 3/2003 | Keefer et al. | |
| 6,565,627 B1 | 5/2003 | Golden et al. | |
| 6,565,635 B2 | 5/2003 | Keefer et al. | |
| 6,565,825 B2 | 5/2003 | Ohji et al. | |
| 6,572,678 B1 | 6/2003 | Wijmans et al. | |
| 6,576,198 B2 | 6/2003 | Cash | 422/173 |
| 6,579,341 B2 | 6/2003 | Baker et al. | |
| 6,593,541 B1 | 7/2003 | Herren | |
| 6,595,233 B2 | 7/2003 | Pulli | |
| 6,605,136 B1 | 8/2003 | Graham et al. | |
| 6,607,584 B2 | 8/2003 | Moreau et al. | |
| 6,630,012 B2 | 10/2003 | Wegeng et al. | |
| 6,641,645 B1 | 11/2003 | Lee et al. | |
| 6,651,645 B1 | 11/2003 | Lee et al. | |
| 6,660,065 B2 | 12/2003 | Byrd et al. | |
| 6,669,472 B1 | 12/2003 | Cash et al. | 432/179 |
| 6,712,087 B2 | 3/2004 | Hill et al. | |
| 6,736,882 B2 | 5/2004 | Kanazirev et al. | 96/108 |
| 6,746,515 B2 | 6/2004 | Wegeng et al. | |
| 6,749,815 B2 | 6/2004 | Cash | 422/175 |
| 6,752,852 B1 | 6/2004 | Jacksier et al. | |
| 6,783,111 B2 | 8/2004 | Cash et al. | 251/160 |
| 6,802,889 B2 | 10/2004 | Graham et al. | |
| 6,835,354 B2 | 12/2004 | Woods et al. | |
| 6,889,710 B2 * | 5/2005 | Wagner | 137/625.46 |
| 6,892,750 B2 | 5/2005 | Cash | 137/311 |
| 6,899,121 B2 | 5/2005 | Cash | 137/311 |
| 6,916,358 B2 | 7/2005 | Nakamura et al. | |
| 6,918,953 B2 | 7/2005 | Lomax, Jr. et al. | |
| 6,974,496 B2 | 12/2005 | Wegeng et al. | |
| 6,978,977 B2 | 12/2005 | Cash et al. | 251/56 |
| 7,025,801 B2 | 4/2006 | Monereau | |
| 7,094,275 B2 | 8/2006 | Keefer et al. | |
| 7,117,669 B2 | 10/2006 | Kaboord et al. | |
| 7,144,016 B2 | 12/2006 | Gozdawa | |
| 7,150,446 B1 | 12/2006 | Cash et al. | 251/129.11 |
| 7,160,356 B2 | 1/2007 | Koros et al. | |
| 7,160,367 B2 | 1/2007 | Babicki et al. | |
| 7,166,149 B2 | 1/2007 | Dunne et al. | |
| 7,189,280 B2 | 3/2007 | Alizadeh-Khiavi et al. | |
| 7,250,074 B2 | 7/2007 | Tonkovich et al. | |
| 7,276,107 B2 | 10/2007 | Baksh et al. | |
| 7,297,279 B2 | 11/2007 | Johnson et al. | 210/669 |
| 7,311,763 B2 | 12/2007 | Neary | |
| RE40,006 E | 1/2008 | Keefer et al. | |
| 7,314,503 B2 | 1/2008 | Landrum et al. | |
| 7,325,562 B2 | 2/2008 | Cash | 137/311 |
| 7,390,350 B2 | 6/2008 | Weist, Jr. et al. | |
| 7,399,346 B2 | 7/2008 | van der Maas | 96/117.5 |
| 7,404,846 B2 | 7/2008 | Golden et al. | |
| 7,449,049 B2 | 11/2008 | Thomas et al. | |
| 7,527,670 B2 | 5/2009 | Ackley et al. | |
| 7,578,864 B2 | 8/2009 | Watanabe et al. | |
| 7,604,682 B2 | 10/2009 | Seaton | |
| 7,608,136 B2 | 10/2009 | van der Maas | 96/117.5 |
| 7,637,989 B2 | 12/2009 | Bong | |
| 7,641,716 B2 | 1/2010 | Lomax, Jr. et al. | |
| 7,645,324 B2 | 1/2010 | Rode et al. | |
| 7,651,549 B2 | 1/2010 | Whitley | |
| 7,674,319 B2 | 3/2010 | Lomax, Jr. et al. | |
| 7,687,044 B2 | 3/2010 | Keefer et al. | |

(56) References Cited

U.S. PATENT DOCUMENTS

| | | | |
|---|---|---|---|
| 7,713,333 B2 | 5/2010 | Rege et al. | |
| 7,722,700 B2 | 5/2010 | Sprinkle | |
| 7,731,782 B2 | 6/2010 | Kelley et al. | |
| 7,740,687 B2 | 6/2010 | Reinhold, III | |
| 7,744,676 B2 | 6/2010 | Leitmayr et al. | |
| 7,763,098 B2 | 7/2010 | Alizadeh-Khiavi et al. | |
| 7,766,025 B2 | 8/2010 | Greco | |
| 7,814,934 B2 | 10/2010 | Thelen | 137/597 |
| 7,819,948 B2 | 10/2010 | Wagner | |
| 7,846,401 B2 | 12/2010 | Hershkowitz et al. | 422/198 |
| 7,858,169 B2 | 12/2010 | Yamashita | |
| 7,938,886 B2 | 5/2011 | Hershkowitz et al. | |
| 7,947,120 B2 | 5/2011 | Deckman et al. | |
| 7,959,720 B2 | 6/2011 | Deckman et al. | |
| 8,034,164 B2 | 10/2011 | Lomax, Jr. et al. | |
| 8,071,063 B2 | 12/2011 | Reyes et al. | |
| 8,142,745 B2 | 3/2012 | Reyes et al. | |
| 8,142,746 B2 | 3/2012 | Reyes et al. | |
| 8,192,709 B2 | 6/2012 | Reyes et al. | |
| 8,216,343 B2 | 7/2012 | Ackley et al. | 95/96 |
| 8,262,783 B2 | 9/2012 | Stoner et al. | |
| 8,268,043 B2 | 9/2012 | Celik et al. | |
| 8,272,401 B2 | 9/2012 | McLean | |
| 8,319,090 B2 | 11/2012 | Kitamura | 136/244 |
| 8,361,200 B2 | 1/2013 | Sayari et al. | |
| 8,444,750 B2 | 5/2013 | Deckman et al. | |
| 8,512,569 B2 | 8/2013 | Eaton et al. | 210/650 |
| 8,524,159 B2 | 9/2013 | Hershkowitz et al. | 422/129 |
| 8,529,662 B2 | 9/2013 | Kelley et al. | |
| 8,529,663 B2 | 9/2013 | Reyes et al. | |
| 8,529,664 B2 | 9/2013 | Deckman et al. | |
| 8,529,665 B2 | 9/2013 | Manning et al. | |
| 8,545,602 B2 | 10/2013 | Chance et al. | |
| 8,591,627 B2 | 11/2013 | Jain | |
| 2001/0047824 A1 | 12/2001 | Hill et al. | |
| 2002/0124885 A1 | 9/2002 | Hill et al. | |
| 2002/0162452 A1 | 11/2002 | Butwell et al. | |
| 2003/0075485 A1 | 4/2003 | Ghijsen | |
| 2003/0170527 A1 | 9/2003 | Finn et al. | |
| 2003/0205130 A1 | 11/2003 | Neu et al. | |
| 2003/0221725 A1 | 12/2003 | Greco | 137/309 |
| 2003/0223856 A1 | 12/2003 | Yuri et al. | |
| 2004/0099142 A1 | 5/2004 | Arquin et al. | |
| 2004/0197596 A1 | 10/2004 | Connor et al. | |
| 2004/0232622 A1 | 11/2004 | Gozdawa | |
| 2005/0109419 A1 | 5/2005 | Ohmi et al. | |
| 2005/0112038 A1 | 5/2005 | Stoll et al. | 422/175 |
| 2005/0114032 A1 | 5/2005 | Wang | |
| 2005/0129952 A1 | 6/2005 | Sawada et al. | |
| 2005/0145111 A1 | 7/2005 | Keefer et al. | |
| 2005/0229782 A1 | 10/2005 | Monereau et al. | |
| 2005/0252378 A1 | 11/2005 | Celik et al. | |
| 2006/0048648 A1 | 3/2006 | Gibbs et al. | |
| 2006/0049102 A1 | 3/2006 | Miller et al. | |
| 2006/0105158 A1 | 5/2006 | Fritz et al. | |
| 2006/0162556 A1 | 7/2006 | Ackley et al. | |
| 2006/0165574 A1 | 7/2006 | Sayari | |
| 2006/0169142 A1 | 8/2006 | Rode et al. | |
| 2006/0236862 A1 | 10/2006 | Golden et al. | |
| 2007/0084241 A1 | 4/2007 | Kretchmer et al. | |
| 2007/0084344 A1 | 4/2007 | Moriya et al. | |
| 2007/0222160 A1 | 9/2007 | Roberts-Haritonov et al. | |
| 2007/0253872 A1 | 11/2007 | Keefer et al. | |
| 2007/0283807 A1 | 12/2007 | Whitley | |
| 2008/0051279 A1 | 2/2008 | Klett et al. | |
| 2008/0072822 A1 | 3/2008 | White | |
| 2008/0282883 A1 | 11/2008 | Rarig et al. | |
| 2008/0282884 A1 | 11/2008 | Kelley et al. | |
| 2008/0282885 A1 | 11/2008 | Deckman et al. | |
| 2008/0282886 A1 | 11/2008 | Reyes et al. | |
| 2008/0282887 A1 | 11/2008 | Chance et al. | |
| 2008/0282892 A1 | 11/2008 | Deckman et al. | |
| 2008/0289497 A1 | 11/2008 | Barclay et al. | |
| 2008/0307966 A1 | 12/2008 | Stinson | 95/187 |
| 2008/0314246 A1 | 12/2008 | Deckman et al. | |
| 2009/0004073 A1 | 1/2009 | Gleize et al. | |
| 2009/0037550 A1 | 2/2009 | Mishra et al. | |
| 2009/0079870 A1 | 3/2009 | Matsui | |
| 2009/0107332 A1 | 4/2009 | Wagner | |
| 2009/0151559 A1 | 6/2009 | Verma et al. | |
| 2009/0211441 A1 | 8/2009 | Reyes et al. | |
| 2009/0241771 A1 | 10/2009 | Manning et al. | |
| 2009/0308248 A1 | 12/2009 | Siskin et al. | |
| 2010/0059701 A1 | 3/2010 | McLean | |
| 2010/0077920 A1 | 4/2010 | Baksh et al. | |
| 2010/0089241 A1 | 4/2010 | Stoner et al. | |
| 2010/0212493 A1 | 8/2010 | Rasmussen et al. | |
| 2010/0251887 A1 | 10/2010 | Jain | |
| 2010/0252497 A1 | 10/2010 | Ellison et al. | |
| 2010/0263534 A1 | 10/2010 | Chuang | |
| 2010/0282593 A1 | 11/2010 | Speirs et al. | |
| 2010/0288704 A1 | 11/2010 | Amsden et al. | 210/688 |
| 2011/0031103 A1 | 2/2011 | Deckman et al. | |
| 2011/0146494 A1 | 6/2011 | Desai et al. | |
| 2011/0217218 A1 | 9/2011 | Gupta et al. | |
| 2011/0277629 A1 | 11/2011 | Manning et al. | |
| 2011/0308524 A1 | 12/2011 | Brey et al. | 128/205.12 |
| 2012/0024152 A1 | 2/2012 | Yamawaki et al. | |
| 2012/0026797 A1 | 2/2012 | Kim | 365/185.18 |
| 2012/0026799 A1 | 2/2012 | Lee | 365/185.21 |
| 2012/0026801 A1 | 2/2012 | Lee | 365/185.25 |
| 2012/0026802 A1 | 2/2012 | Confalonieri | 365/189.2 |
| 2012/0026803 A1 | 2/2012 | Lee | 365/189.05 |
| 2012/0026804 A1 | 2/2012 | Nagashima et al. | 365/189.06 |
| 2012/0031144 A1 | 2/2012 | Northrop et al. | |
| 2012/0067216 A1 | 3/2012 | Corma-Canos et al. | |
| 2012/0152115 A1 | 6/2012 | Gerds et al. | |
| 2012/0222551 A1 | 9/2012 | Deckman | |
| 2012/0222552 A1 | 9/2012 | Ravikovitch et al. | |
| 2012/0222553 A1 | 9/2012 | Kamakoti et al. | |
| 2012/0222554 A1 | 9/2012 | Leta et al. | |
| 2012/0222555 A1 | 9/2012 | Gupta et al. | |
| 2012/0255377 A1 | 10/2012 | Kamakoti et al. | |
| 2012/0308456 A1 | 12/2012 | Leta et al. | |
| 2012/0312163 A1 | 12/2012 | Leta et al. | |
| 2013/0061755 A1 | 3/2013 | Frederick et al. | |
| 2013/0225898 A1 | 8/2013 | Sundaram et al. | |

FOREIGN PATENT DOCUMENTS

| | | | |
|---|---|---|---|
| CA | 2 228 206 | 7/1998 | |
| CA | 2 297 590 | 8/2000 | |
| CA | 2 297 591 | 8/2000 | |
| CA | 2 237 103 | 12/2001 | |
| CA | 2 357 356 | 3/2002 | |
| CA | 2423178 | 4/2013 | C02F 1/28 |
| EP | 0257493 | 2/1988 | |
| EP | 0426937 | 5/1991 | |
| EP | 1 004 341 | 5/2000 | |
| EP | 1004341 | 5/2000 | |
| EP | 1 018 359 | 7/2000 | |
| EP | 1413348 | 8/2002 | |
| EP | 1577561 | 9/2005 | |
| EP | 1 203 610 | 12/2005 | |
| EP | 1798197 | 6/2007 | |
| EP | 1045728 | 11/2009 | |
| JP | 58/114715 | 7/1983 | B01D 53/34 |
| JP | 59-232174 | 12/1984 | |
| JP | 60-189318 | 12/1985 | H03K 6/00 |
| JP | 02-253818 | 10/1990 | B01D 53/04 |
| JP | 11/280921 | 10/1999 | F16K 1/00 |
| JP | 2000024445 | 8/2001 | |
| JP | 2002348651 | 12/2002 | |
| JP | 2006016470 | 1/2006 | |
| JP | 2006036849 | 2/2006 | |
| JP | 2008/272534 | 11/2008 | B01D 53/34 |
| WO | WO 99/43418 | 9/1999 | |
| WO | WO00/35560 | 6/2000 | |
| WO | WO03-031328 | 4/2003 | C01B 13/02 |
| WO | WO2005/032694 | 4/2005 | |
| WO | WO2005/070518 | 8/2005 | |
| WO | WO2006/017940 | 2/2006 | |
| WO | WO2006/074343 | 7/2006 | |
| WO | WO 2007/111738 | 10/2007 | |

(56) References Cited

FOREIGN PATENT DOCUMENTS

| | | | |
|---|---|---|---|
| WO | WO 2010/123598 | 10/2010 | |
| WO | WO 2010/130787 | 11/2010 | |
| WO | WO 2011/139894 | 11/2011 | |
| WO | WO2010-081809 | 12/2011 | ............ B01D 53/04 |
| WO | WO2012/118755 | 9/2012 | |
| WO | WO2012/118757 | 9/2012 | |
| WO | WO2012/118758 | 9/2012 | |
| WO | WO2012/118759 | 9/2012 | |
| WO | WO2012/118760 | 9/2012 | |
| WO | WO2012/161826 | 11/2012 | |
| WO | WO2012/161828 | 11/2012 | |
| WO | WO2013/022529 | 2/2013 | |

OTHER PUBLICATIONS

Conviser, (1964) "Removal of CO2 from Natural Gas With Molecular Sieves," Publication, pp. 1F-12F.

GE Oil & Gas (2007) "Dry Gas Seal Retrofit," Florene, Italy, www.ge.com/oilandgas.

Farooq, et al. (1990) "Continuous Contercurrent Flow Model for a Bulk PSA Separation Process," *AIChE J.*, v36 (2) p. 310-314.

FlowServe "Exceeding Expectations, US Navy Cuts Maintenance Costs With Flowserve GX-200 Non-Contacting Seal Retrofits," *Face-to-Face*, v17.1.

Herrmann, et al. (2008) "Curvelet-Based Seismic Data Processing: A Multiscale and Nonlinear Approach," *Geophysics*, v73.1, pp. A1-A5.

Hopper, et al. (2008) "World's First 10,000 psi Sour Gas Injection Compressor," *Proceedings of the 37th Turbomachinery Symosium*, pp. 73-95.

Reyes, et al. (1997) "Frequency Modulation Methods for Diffusion and Adsorption Measurements in Porous Solids," *J. Phys. Chem. B.* v101, pp. 614-622.

Sahni, et al. (2005) "Multiresolution Wavelet Analysis for Improved Reservoir Description," SPE-87820, *Soc. of Petroleum Eng.-Reservoir Evaluation & Engineering*, pp. 53-69 (XP-002550569).

Stahley, (2003) "Design, Operation, and Maintenance Considerations for Improved Dry Gas Seal Reliability in Centrifugal Compressors," pp. 1-15.

Suzuki, (1985) "Continuous-Countercurrent-Flow Approximation for Dynamic Steady State Profile of Pressure Swing Adsorption" *AIChE Symp. Ser.* v81 (242) pp. 67-73.

(2008), "Rapid Cycle Pressure Swing Adsorption (RCPSA)," QuestAir, 4 pgs.

(2008), "Rapid Cycle Pressure Swing Adsorption," ExxonMobil Research and Engineering, 2 pgs.

Kikkinides, E. S. et al. (1995) "Natural Gas Desulfurization by Adsorption: Feasibility and Multiplicity of Cyclic Steady States," *Ind. Eng. Chem. Res.*, v. 34, pp. 255-262.

\* cited by examiner

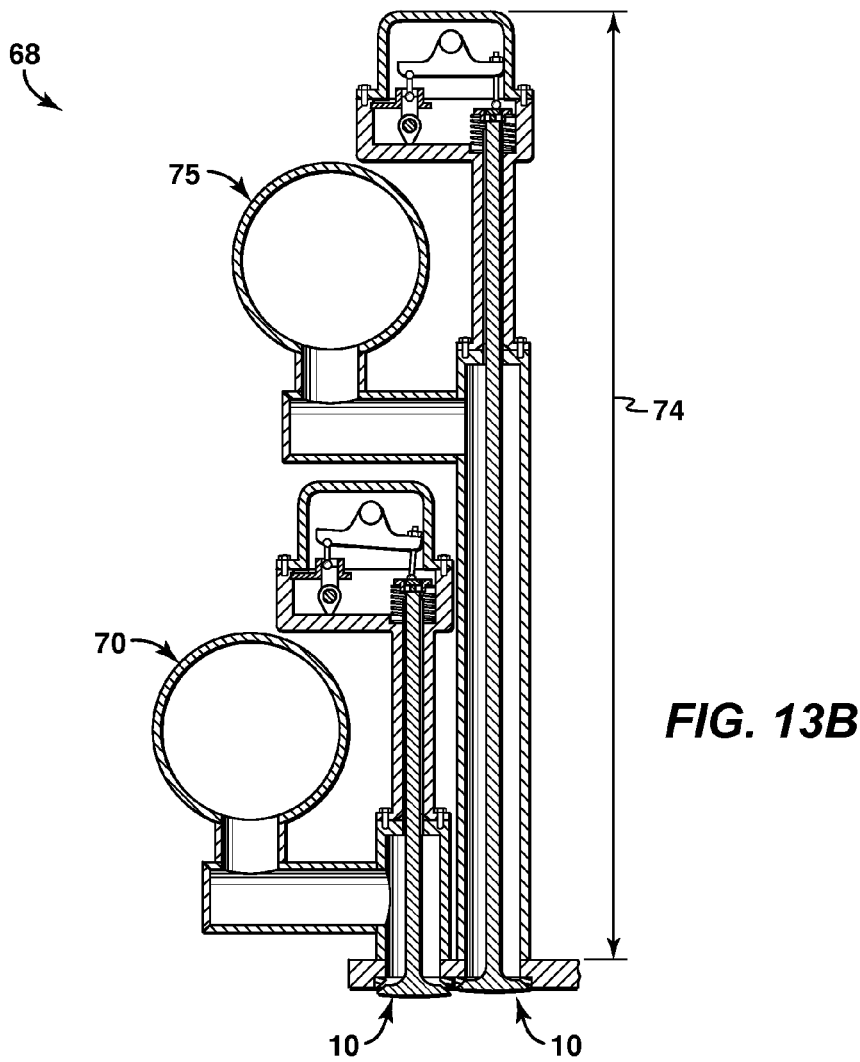
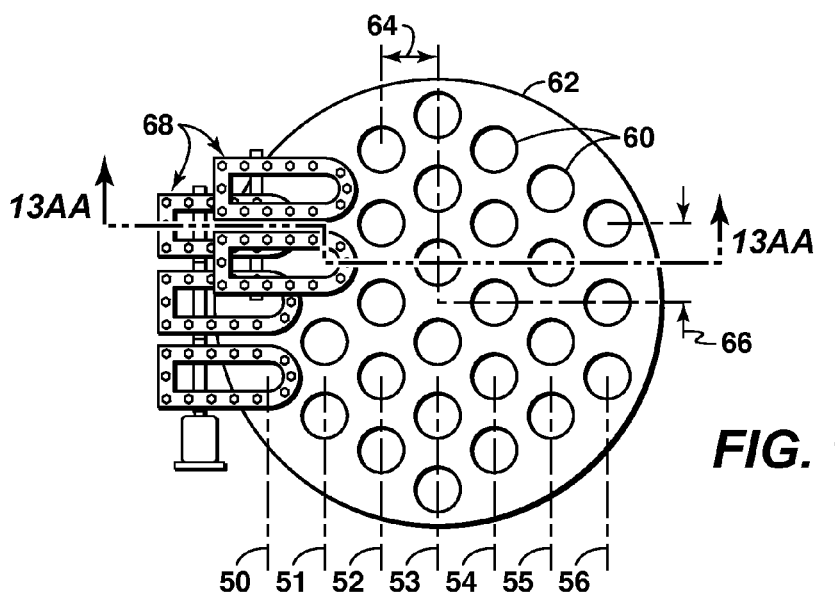
FIG. 13B
FIG. 13A

APPARATUS AND SYSTEMS HAVING A RECIPROCATING VALVE HEAD ASSEMBLY AND SWING ADSORPTION PROCESSES RELATED THERETO

CROSS REFERENCE TO RELATED APPLICATIONS

This application is the National Stage entry under 35 U.S.C. 371 of PCT/US2012/026799 that published as WO 2012/118757 and was filed on 27 Feb. 2012, which claims the benefit of U.S. Provisional Application No. 61/448,120, filed on 01 Mar. 2011, each of which is incorporated by reference, in its entirety, for all purposes.

This application is related to U.S. Patent Application No. 61/448,117 entitled APPARATUS AND SYSTEMS HAVING AN ENCASED ADSORBENT CONTACTOR AND SWING ADSORPTION PROCESSES RELATED THERETO, filed Mar. 1, 2011; U.S. Patent Application No. 61/448,121 entitled METHODS OF REMOVING CONTAMINANTS FROM A HYDROCARBON STREAM BY SWING ADSORPTION AND RELATED APPARATUS AND SYSTEMS, filed Mar. 1, 2011; U.S. Patent Application No. 61/448,123 entitled APPARATUS AND SYSTEMS HAVING A ROTARY VALVE ASSEMBLY AND SWING ADSORPTION PROCESSES RELATED THERETO, filed Mar. 1, 2011; and U.S. Patent Application No. 61/448,125 entitled APPARATUS AND SYSTEMS HAVING COMPACT CONFIGURATION MULTIPLE SWING ADSORPTION BEDS AND METHODS RELATED THERETO, filed Mar. 1, 2011, and U.S. Patent Application No. 61/594,824 entitled METHODS OF REMOVING CONTAMINANTS FROM A HYDROCARBON STREAM BY SWING ADSORPTION AND RELATED APPARATUS AND SYSTEMS, filed Feb. 3, 2012, each of which is herein incorporated by reference in its entirety.

FIELD OF THE INVENTION

The present application provides apparatus and systems having poppet valve assemblies and swing adsorption separation techniques related thereto. More particularly, the present application provides comprising poppet valve assemblies having one or more static poppet valves and corresponding one or more static ports integral to a single dynamic poppet valve.

BACKGROUND OF THE INVENTION

Conventional poppet valve assemblies have been incorporated into many forms of industrial machinery, engines, compressors, etc. and have been used for regulating the flow of gaseous vapor or liquids in processes that require fast acting on-to-off flow regimes. A simple poppet valve assembly consists of a hole, usually round or oval, in the valve body and a valve head, usually a disk shape on the end of a shaft, which is called the valve stem. Flow occurs through the area between the valve head and the valve body. The flow area is varied as the stem guides the valve head by sliding through a valve guide. In some applications a pressure differential helps to seal or open the valve.

While conventional poppet valves have been in commercial use for years, there has been a continuous effort to improve the overall technology. While conventional approaches have worked to varying degrees, there is still a need in the art for further improvement to poppet valve technology.

SUMMARY OF THE INVENTION

Provided are apparatus and systems having a poppet valve assembly and swing adsorption separation techniques related thereto. The present apparatus and systems include a poppet valve assembly comprising: a valve body; a plurality of static valves fixedly secured to the valve body; a single dynamic poppet valve having a plurality of openings, wherein the plurality of static valves align and mate with the plurality of openings, the single dynamic poppet valve reciprocates to selectively open and close the plurality of static valves.

Also provided are swing adsorption vessels comprising: a plurality of adsorbent beds; a plurality of poppet valves, each of the plurality of adsorbent beds being in fluid communication with only one of the plurality of poppet valves, each poppet valve comprising: a valve body; a plurality of static valves fixedly secured to the valve body; a single dynamic poppet valve having a plurality of openings, wherein the plurality of static valves align and mate with the plurality of openings, the single dynamic poppet valve reciprocates to selectively open and close the plurality of static valves.

BRIEF DESCRIPTION OF THE FIGURES

FIGS. 13a and 13b are each exemplary poppet valve assemblies.

DETAILED DESCRIPTION OF THE INVENTION

Figure 1:
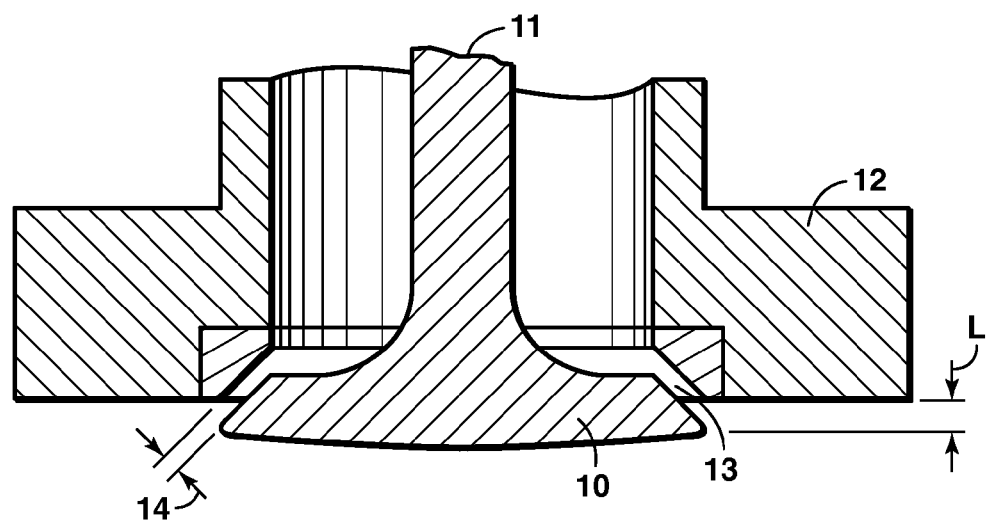
FIG. 1 hereof is a side cross-sectional view of a conventional poppet valve assembly.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The present apparatus, methods, and systems provide for the reduction of the number of poppet valves needed for a given poppet valve assembly compared to conventional poppet valve assemblies for the same use. The mechanized drive train system that is used to drive the poppet valves in the poppet valve assemblies of the present invention directionally decreases overall engineering, fabrication, and long-term operational costs, while improving unit reliability by employing fewer poppet valve assemblies.

Other applications in the technical area include U.S. Patent Application Nos. 61/447,806, 61/447,812, 61/447,824, 61/447,848, 61/447,869, 61/447,835, and 61/447,877, each of which is herein incorporated by reference in its entirety.

Poppet valve assemblies may be configured as either a two-way normally closed valve or a two-way normally open valve. In the first, a stem impels the poppet valve from its seat to open up the amount of allowable flow area. In the latter, the flow area is constricted as a stem pushes the poppet back into its seat. The stem of a poppet valve is typically powered by one of any number of actuators that vary with different types of poppet valves. Some are automatic, while others require manual activation. Certain types of poppet valves involve the use of a piston chamber, which applies pressure to the stem, in turn applying pressure to the poppet. Still other designs utilize a solenoid coil—known as a poppet solenoid valve—which employs a tightly-wound spiral to exert force onto the stem.

Poppet valve assemblies may be used in a wide variety of applications requiring frequent changes to the fluid flow rate. The most common application is internal combustion engines, in which flow to the engine cylinders is stopped and started many hundreds of times per minute. Poppet valve assemblies can also be used in a variety of industrial processes such as compressors, turbines, reactors, and separation devices. For example, poppet valve assemblies are useful in reverse flow reactors as described in Intl. Patent App. Pub. No. 2011/149640, which is incorporated by reference herein.

In another exemplary application, poppet valve assemblies may be used in gas separation apparatus wherein a target gas is separated from a gaseous mixture by adsorption of the target gas onto an adsorbent material. Such apparatus are comprised of a plurality of swing adsorption vessels, each of which contain adsorbent beds. Each swing adsorption vessel experiences a different step of an adsorption cycle at any given point in time. A complete cycle, comprised of an adsorption step and subsequent regeneration steps, can be from less than a minute to many minutes, and as such very fast on/off flows of gas need to occur during each cycle. It is important for gas separation equipment to be compact, especially at some locations, such as offshore, where space is a premium.

In one or more embodiments it is desirable to increase the available flow area through a poppet valve assembly by several methods which may include (a) having a large valve head diameter, (b) adjusting the valve lift, (c) adjusting the valve cycle duration, (d) increasing the number of poppet valve locations, and (e) combinations thereof.

To increase the available flow area through a poppet valve assembly, a plurality of openings within a single poppet valve assembly may be utilized. The present invention is better understood with reference to the figures.

FIG. 1 hereof is a cross-sectional view along a vertical plane of a conventional poppet valve assembly. FIG. 1 shows a poppet valve which consists of a head 10 and a stem 11. The poppet valve body 12 and seat 13 remain in a static position and do not move. The poppet valve is dynamic, moving up and down during operation via actuation of the valve stem 11. The distance the valve head travels is commonly referred to the valve lift, and is shown as distance "L" in FIG. 1. When the poppet valve assembly is in the open position, flow occurs through the curtain area 14, which is the gap between the poppet valve head 10 and valve seat 13 when the poppet valve is opened enough so that the angle of the chamfer on the valve head is substantially equal to that of the static seat 13. The cylindrical curtain area 14 defines the maximum flow area when the valve is fully opened. In other words, the curtain area can be defined as the flow area created by the combination of valve diameter and valve lift.

Figure 2A:
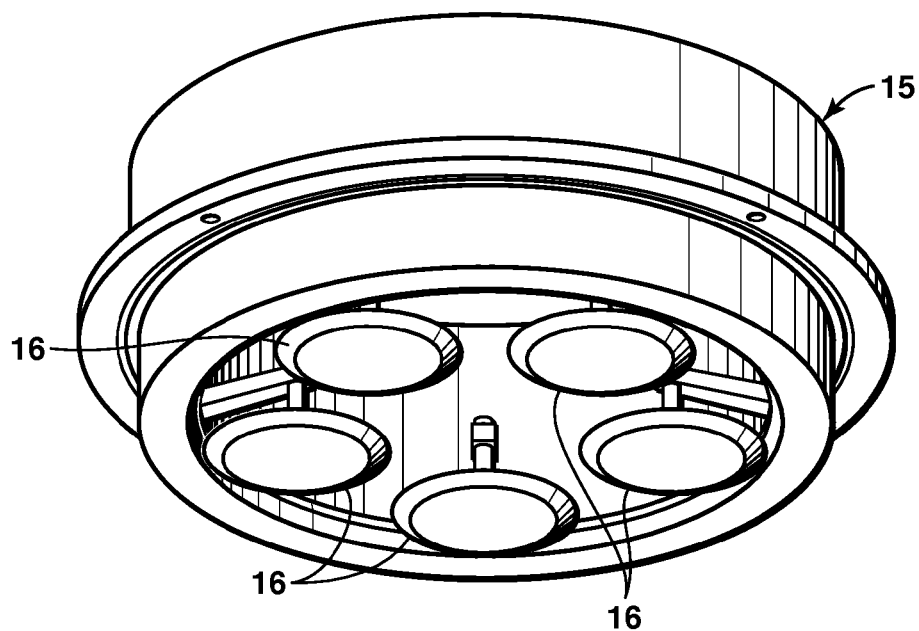
FIG. 2a hereof is an illustration of a poppet valve body of the present invention showing five static valves.
Figure 2B:
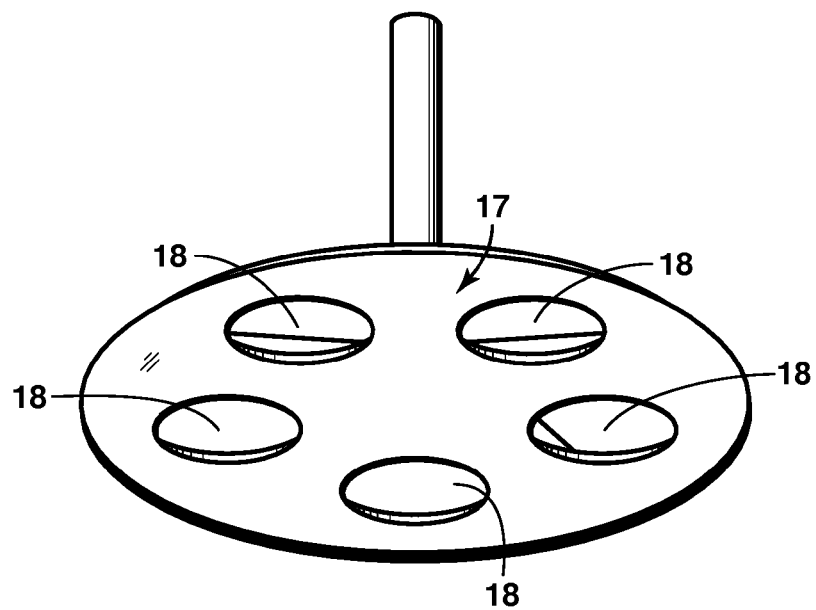
FIG. 2b hereof is an illustration of a dynamic poppet valve, which mates with the static poppet valve body of FIG. 2a, showing five dynamic valve ports.
Figure 7:
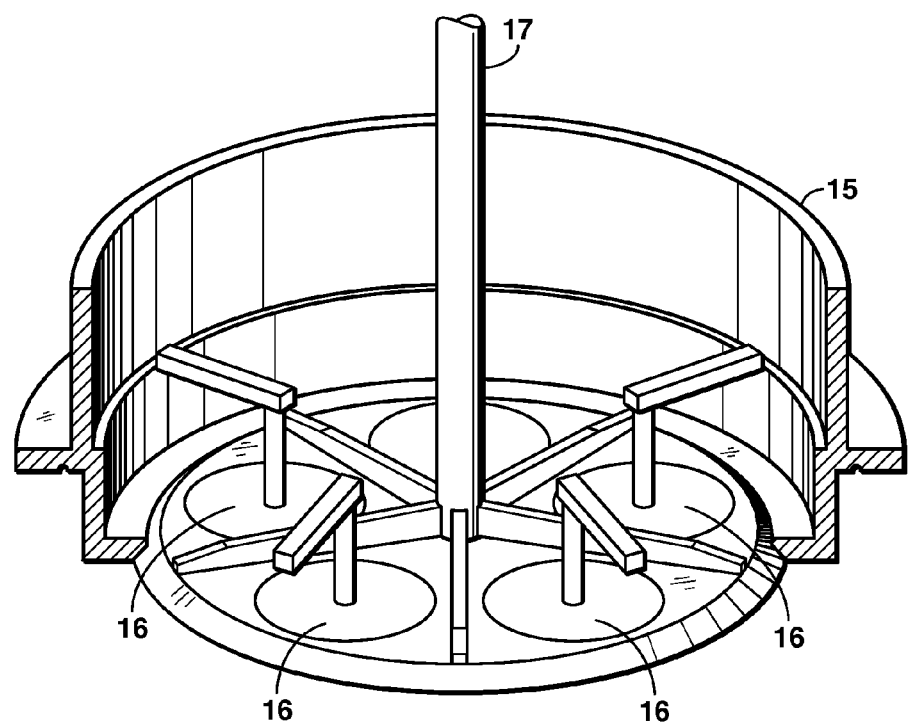
FIG. 7 hereof is an elevated perspective view of a preferred poppet valve assembly of the present invention, but with the valve body cut-away to show the poppet valve in a closed position.
Figure 8:
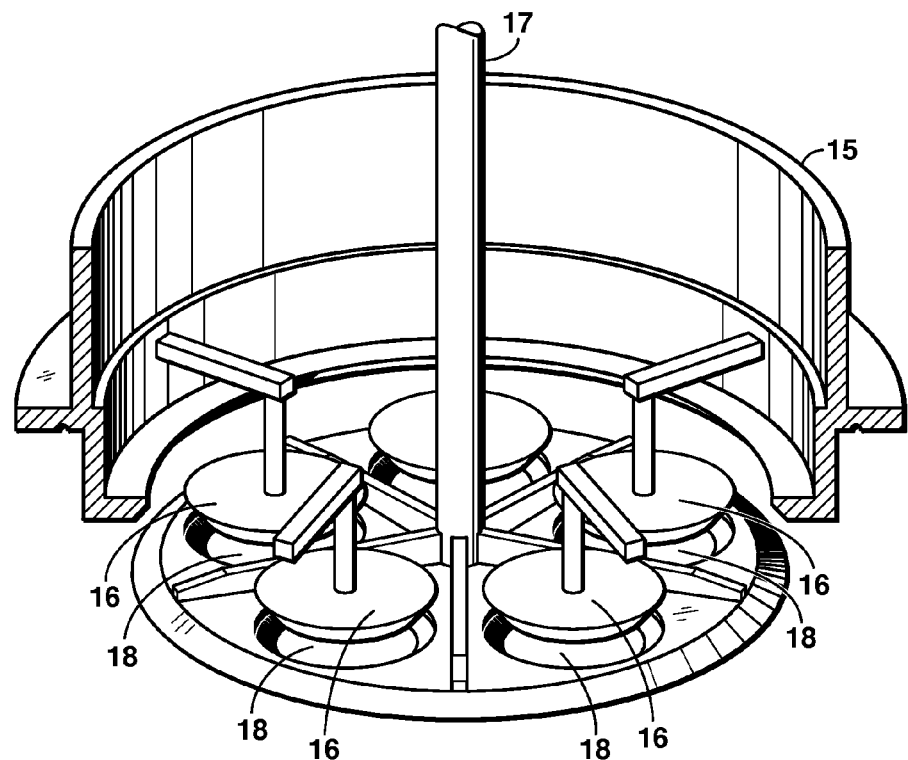
FIG. 8 hereof is the same perspective view as that of FIG. 7 hereof, but showing the poppet valve open.

FIG. 2a hereof is an illustration of valve body 15 showing five static valves 16 that are permanently secured to the valve body 15. FIG. 2b hereof shows a dynamic poppet valve 17 having five openings 18, referred to as dynamic valve ports. The five static valves 16 align and mate with the five dynamic valve ports 18 as shown in FIGS. 7 and 8. Flow through the poppet valve assembly occurs through the area between the five dynamic valve ports and static valves, as well as the area between the outside diameter of the head of the dynamic poppet valve 17 and the valve body 15. The one dynamic poppet valve 17 reciprocates to selectively open and close these six flow areas with the movement of one part. The number of static valves and dynamic ports can vary depending on the intended use and size of the overall equipment. The embodiment of the present invention shown in FIGS. 2a and 2b integrates a series of defined dynamic valve ports 18 in only one dynamic poppet valve 17. Thus, the movement of only one part, dynamic poppet valve 17, is required to open or close all valves (e.g., static and dynamic). In effect, the sum of all independently defined ports can now contribute to the increased and usable curtain area. Also, a significant mechanical advantage is gained by the present invention since only one moving part, which controls the specified curtain flow area, is required verses multiple moving parts to control a similar curtain area as may be required in conventional poppet valve systems.

The design of the dynamic poppet valve in the present invention embodied in FIGS. 2a and 2b hereof results in performance enhancements including minimizing valve surface drag, minimizing the stagnant area below the valve head, and increasing the effective valve area without increasing the number of poppet valve assemblies. Valve surface drag is reduced due to the dynamic valve ports 18 which reduce the surface area of the dynamic poppet valve head. As a result of the reduced surface area, the force applied to the poppet valve by the fluid flow is reduced, which leads to beneficial cost savings for engineering time, fabrication, material and overall unit reliability. The reduced surface drag also enables a wider range of simplified mechanized apparatus' sized for a drive train assembly.

A further benefit is reduction in the stagnant area below the valve head. In conventional poppet valve assemblies, an unavoidable disadvantage of increasing the valve diameter to increase the flow area is that the stagnant area below the valve head increases proportionally to the surface area. In most cases, it is not preferred to have an undesirable stagnant zone below each poppet valve. The undesirable stagnant zone below the dynamic poppet valve head of the present invention is reduced because flow occurs through the plurality of valve ports in the dynamic poppet valve, thus utilizing more of the area of the valve head than in conventional poppet valves. The advantage of having an increased and well-distributed flow pattern is that it directionally reduces the stagnant zone below the valve head.

Further, the poppet valve assembly of the present invention improves upon conventional poppet valves by filling the currently unused valve head surface with usable valve ports. That is, by distributing additional openings within the valve head, the flow area is increased for the valve assembly. Another advantage is a reduction in the number of actuators in that it provides an instant multi-valve port communication without having to independently actuate each separate valve port. The single dynamic poppet valve controls the total valve curtain area, which is comprised of both static and dynamic valve port apertures. This geometric configuration increases the flow area without the need to increase the number of poppet valves. Also, for a given valve body diameter, the flow area available is significantly increased over a conventional poppet valve assembly with the same valve body diameter.

Figure 3:
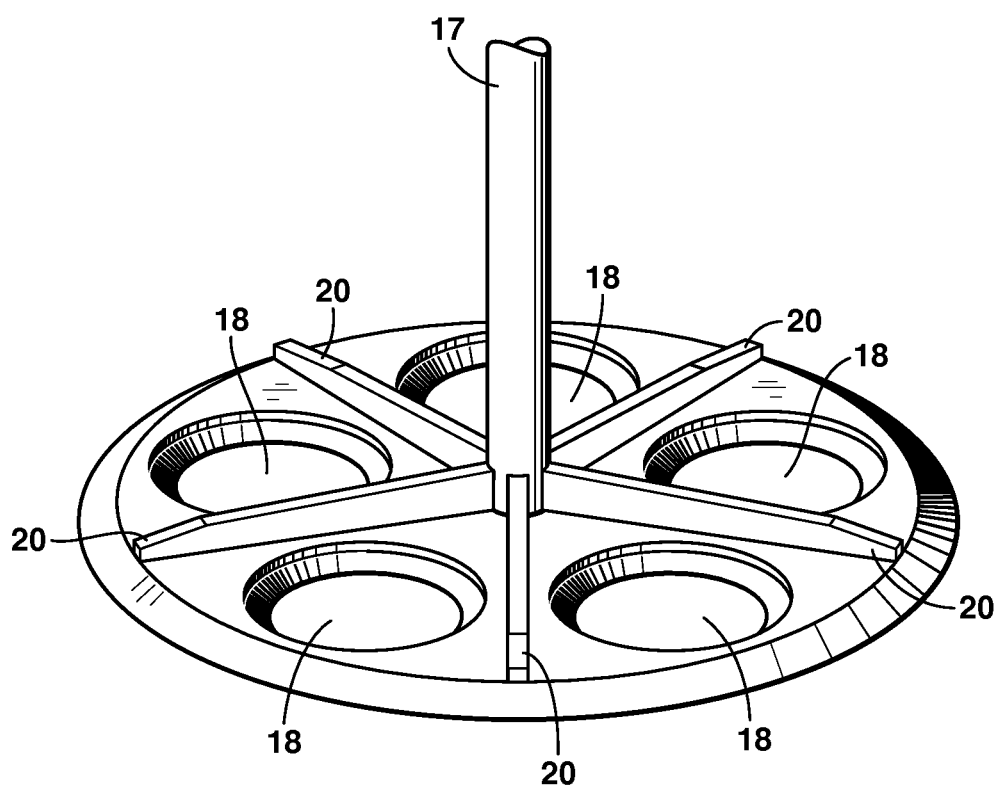
FIG. 3 hereof is an elevated perspective view of the dynamic poppet valve of FIG. 2b hereof showing flow vanes which are an integral part of the poppet valve.

FIG. 3 is an elevated perspective view of a preferred dynamic poppet valve 17 of the present invention showing integral flow vanes 20 that are positioned between each dynamic valve port 18. The flow vanes are optional but may be used to provide additional mechanical strength for the poppet valve head and to enhance the uniformity of flow through the poppet valve assembly. If used, the dimensions and shape of flow vanes 20 are dependent on such things as the type of fluid and the flow rate used in a given application.

Figure 4:
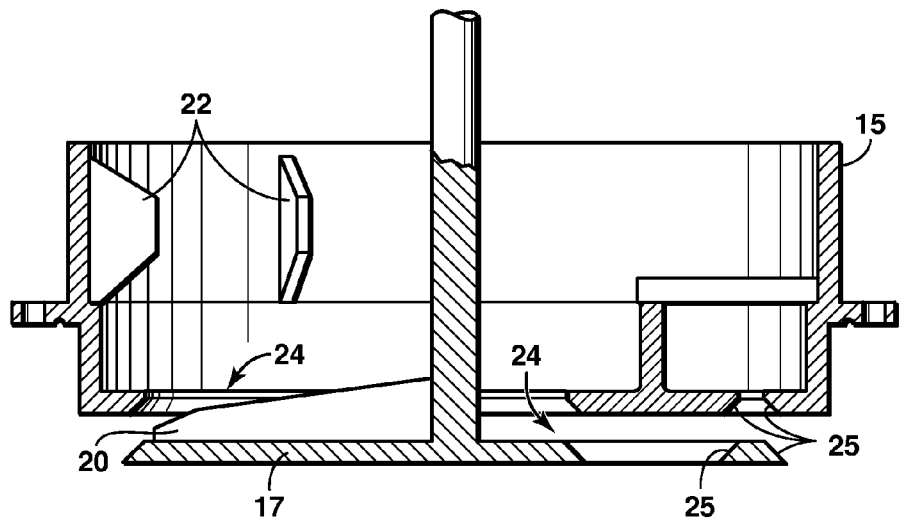
FIG. 4 hereof is a cross-sectional view along a vertical plane of a dynamic poppet valve and corresponding valve body with static valves showing the valves in an open position.
Figure 5:
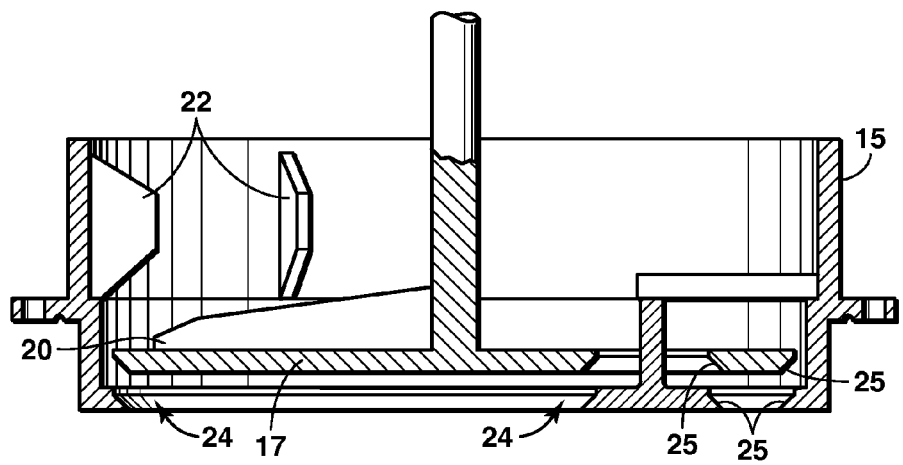
FIG. 5 is an illustration of the same assembly shown in FIG. 4 hereof with the valve also in an open position, but seating with the valve from the opposite surface to that shown in FIG. 4 hereof.

FIGS. 4 and 5 hereof are partial cross-sectional views along a vertical plane of a poppet valve assembly comprised of a dynamic poppet valve and corresponding valve body with static ports showing the valves in an open position. It is noted that the inside wall of the valve body can also contain one or more flow vanes 22 of suitable dimension and number. It is preferred that both sets of vanes, that is the vanes 20 on the dynamic poppet valve head 17 as well as the flow vanes 22 located integral to the valve body 15, be orientated in the same plane as one another. Both the dynamic and static valve port throat passages can incorporate upstream or downstream flow vanes 20, 22. This feature can be used for optimizing the flow 24 through the valve, which results in mitigating undesirable flow stream back mixing effects. FIG. 5 hereof shows the valve seating with the port from the opposite surface to that shown in FIG. 4 hereof. The defined valve port seat is designed with matching uniform chamfer faces 25 between the dynamic and static parts. The dynamic valve can be actuated either out of the valve body as in FIG. 4, or in to the valve body as in FIG. 5. The chamfered faces 25 can be configured to meet either of the actuator travel directions. To ensure a tight seal, it is preferred that the chamfers are oriented so that process environment forces push the dynamic poppet valve into the closed position to ensure that a tight material-to-material contact is realized between the mating parts.

Figure 6A:
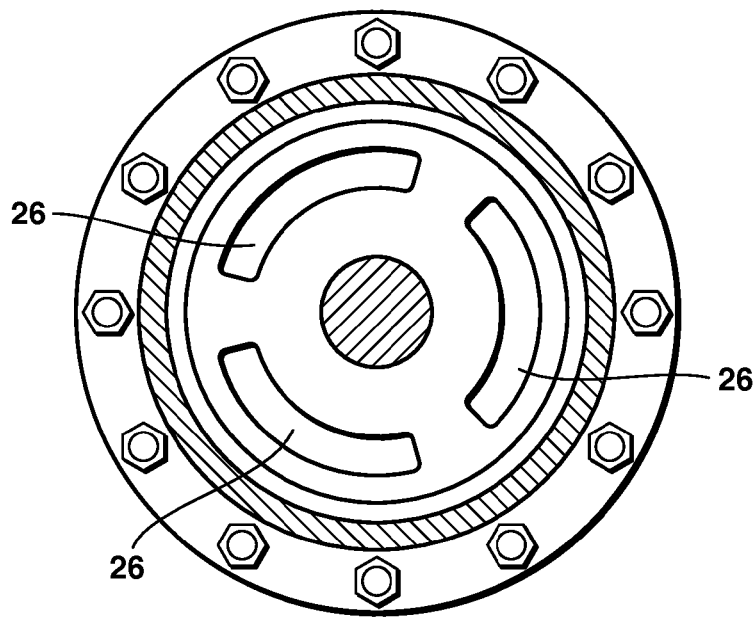
FIGS. 6a and 6b show a top view of a dynamic poppet valve with the dynamic valve ports and corresponding static valve having a non-circular cross section.
Figure 6B:
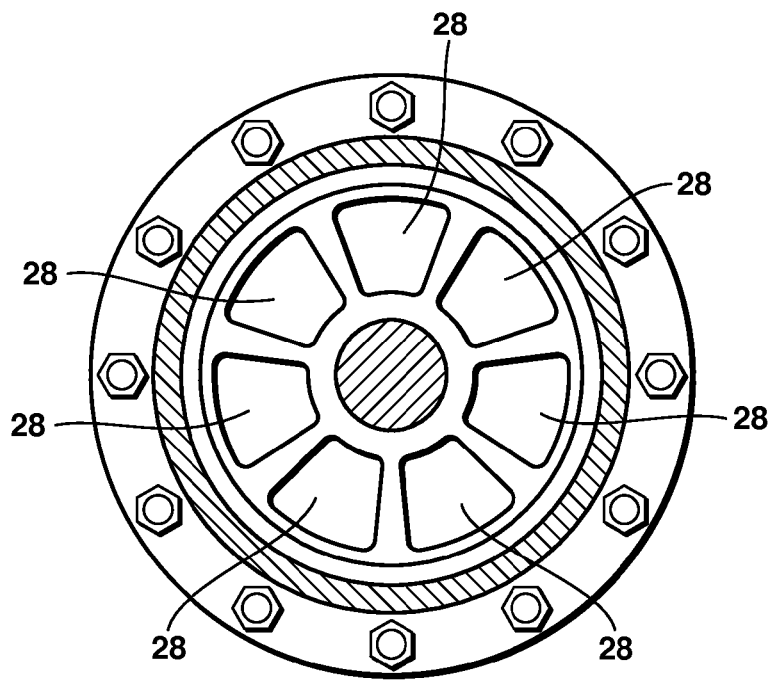

FIGS. 6a and 6b hereof are top views of poppet valve assemblies with static port geometries 26, 28 that are alternatives to the circular cross-section shown in FIGS. 2a and 2b hereof. The defined valve port geometry can be configured into any realized open shape that meets the flow parameter objectives having a calculated valve lift, cycle duration, valve curtain area, total curtain perimeter or circumference length. The independent parts that form both the dynamic and static valve ports are securely anchored such that they are capable of withstanding excessive internal operating load conditions, including a wide range of vibration frequency and the actuator's dynamic shock loads. For select operating conditions, the anchoring mechanism for the static valves can be engineered with an integral shock absorber (not shown) to cushion the seating cycle when the valve closes. For operating conditions that require soft or malleable seating material, the dynamic poppet valve can rotate with respect to the static valve body, which results in a continually changing seating surface to avoid uneven wear.

FIG. 7 hereof is an elevated perspective view of a preferred poppet valve assembly of the present invention, but with the valve body cut-away to show the poppet valve in a closed position. In this configuration, the valve body has a plurality of static valves fixed in a single orientation relative to the valve body. The single dynamic poppet valve 17 has a stem coupled to a poppet valve head, wherein the poppet valve head has a plurality of openings, or ports, with each opening aligned to mate with one of the plurality of static valves. In this position, the dynamic poppet valve and valve body with the static valves prevent fluid flow through the plurality of ports between the valve body and a location external to the valve body. However, the stem and poppet valve head of the dynamic poppet valve 17 are capable of (e.g., axial movement or movement along a defined path), as noted above, providing a fluid flow path through the plurality of ports between the valve body and a location external to the valve body. Accordingly, FIG. 8 hereof is the same perspective view as that of FIG. 7 hereof, but showing the poppet valve in the open position.

Figure 9:
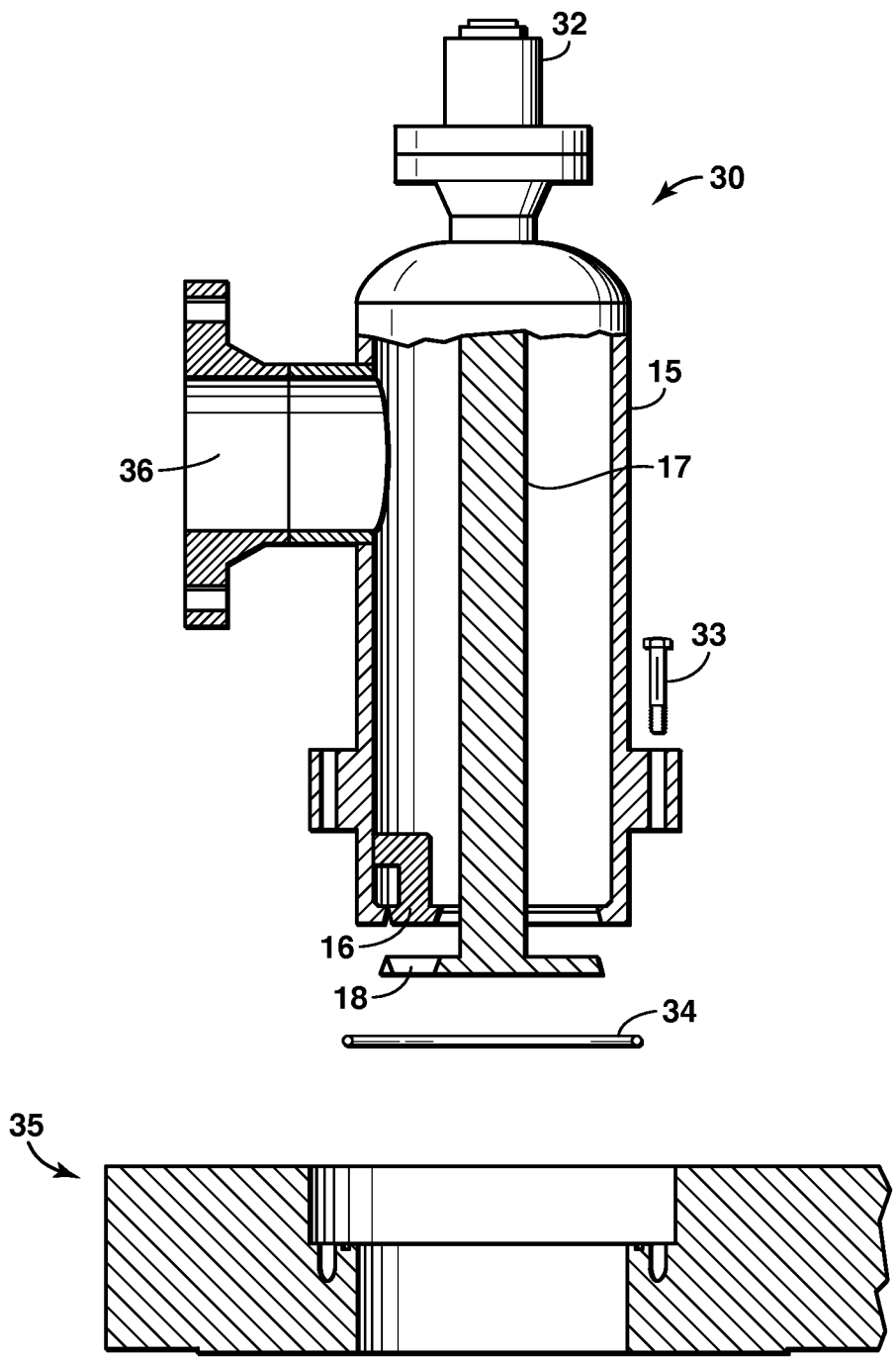
FIG. 9 is a cross-sectional view cut along a vertical plane of a preferred reciprocating drive system for the poppet valve assemblies of the present invention.

FIG. 9 is an exploded cross-sectional view cut along a vertical plane of a preferred reciprocating drive system 32 for the poppet valve assemblies of the present invention. In the embodiment of the assembled apparatus shown in FIG. 9, the valve body 15 can be attached to a vessel head or other suitable member 35 by way of a plurality of threaded fasteners 33. In order to maintain a reliable gaseous seal between the valve body 15 and the vessel head 35, a gasket seal 34 may be used. Without deviating from the spirit of the invention, an alternate method of assembly may be made by way of a weld junction, which is not shown. The latter method of assembly may be used in lieu of items 33 and 34. Fluid flow into and out of the poppet valve assembly occurs through the nozzle 36 which may be attached to piping. Additional connections to the assembly (not shown) may be included for control and actuation of the reciprocating drive system using, for example, compressed air, hydraulic fluid, or electricity.

Figure 10:
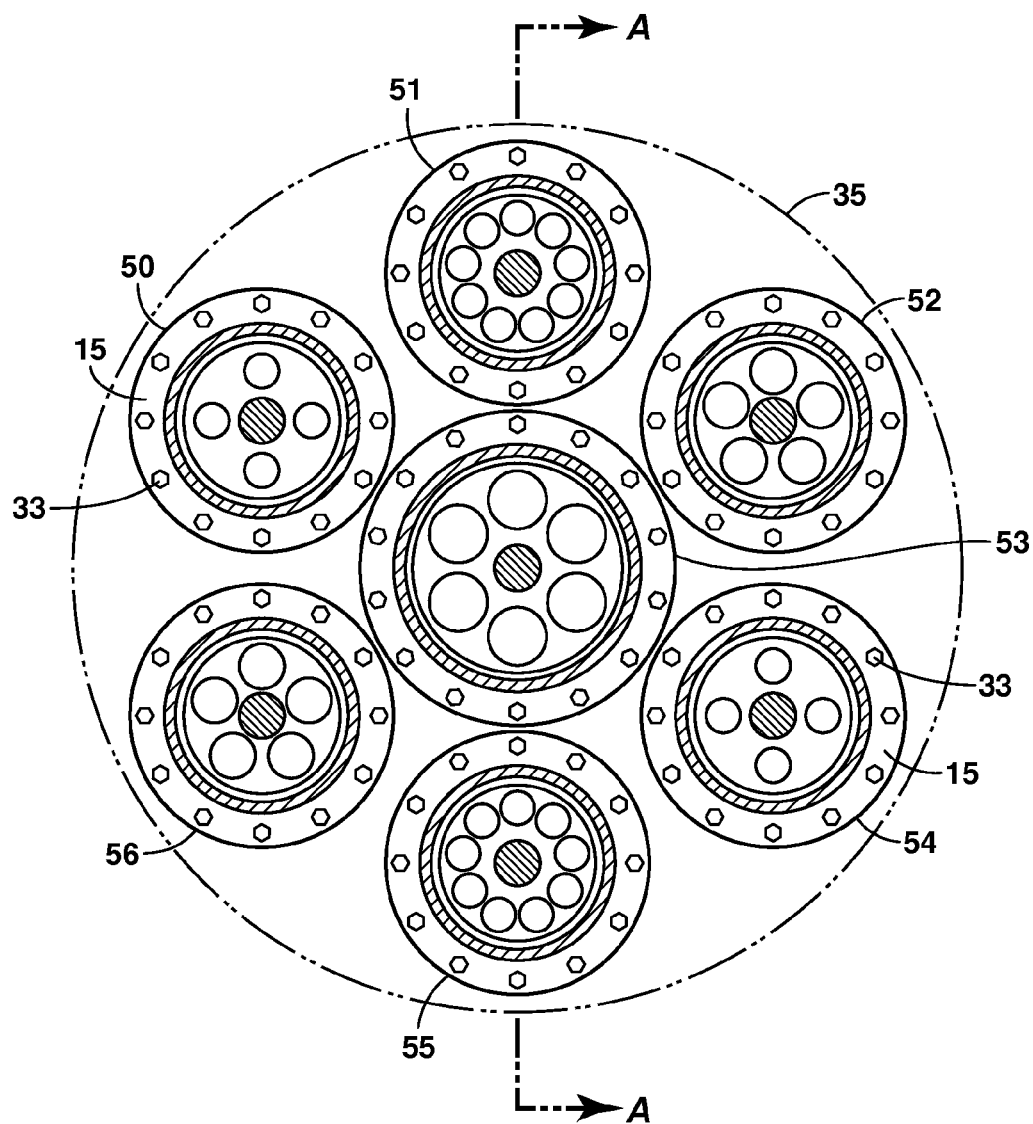
FIG. 10 hereof is a top view of the poppet valve assembly showing seven poppet valve assemblies attached to a swing adsorption vessel.
Figure 11:
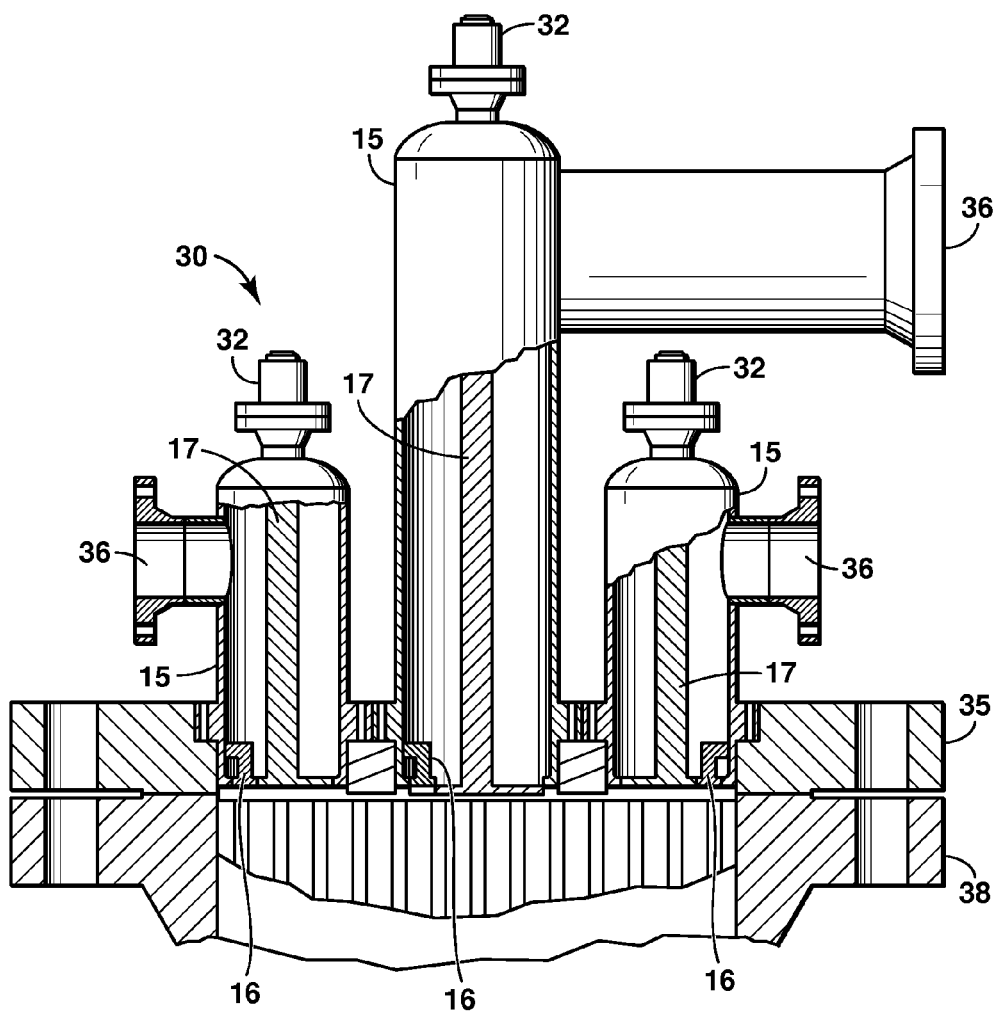
FIG. 11 hereof is a cross-sectional view taken along line A-A of FIG. 10 showing one valve open and two valves closed.

The present invention may be used for process units that require multiple inlets and/or outlets of one or more fluids. As an example, the present invention may be used in a pressure swing adsorption (PSA) system for separating contaminants from a gaseous feed stream. Rapid switching between multiple feed, product, exhaust, and purge streams is required as each adsorbent bed in the PSA system undergoes a cycle to adsorb contaminants and subsequently regenerate the bed. Poppet valve assemblies according to the present invention may be used to coordinate the flows into and out of the adsorbent bed. For example, poppet valve assemblies may be installed on the head of a vessel containing an adsorbent bed, as shown in FIG. 10 hereof. Each valve body 15 is attached to the vessel head 35 using threaded fasteners 33 and gasket seals (not shown) as described in FIG. 9. A cross-sectional view taken along line A-A is shown in FIG. 11 hereof, with the center valve open and the outside valves closed. The vessel head with attached poppet valve assemblies may be attached to the process vessel 38, and piping associated with the various streams may be attached to the respective nozzle and flanges 36.

The assembled apparatus may be engineered to operate at any given angle. The valve stem angle can be orientated between a vertical (90 degree) and a horizontal (0 degree) axial plane. The valve stem's movement can be actuated through a number of commercially demonstrated and available mechanized drive train systems. The valve stem preferably has a key or locking collar (not shown), which reliably ensures that stem rotation does not occur during the operating cycle.

Figure 12A:
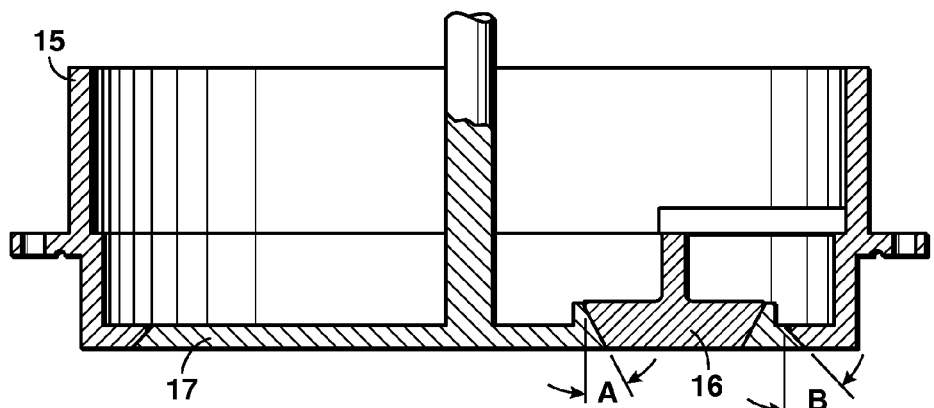
FIG. 12a hereof is a cross-sectional view along a vertical plane of a preferred poppet valve assembly of the present invention, but with the valve body cut-away to show the poppet valve in a closed position.
Figure 12B:
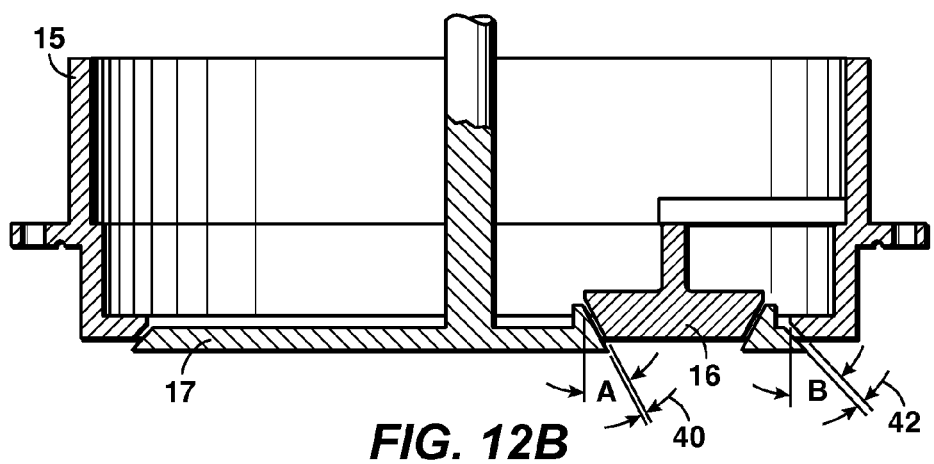
FIG. 12b hereof is a cross-sectional view along a vertical plane of a preferred poppet valve assembly of the present invention, but with the valve body cut-away to show the poppet valve in a partially open position.
Figure 12C:
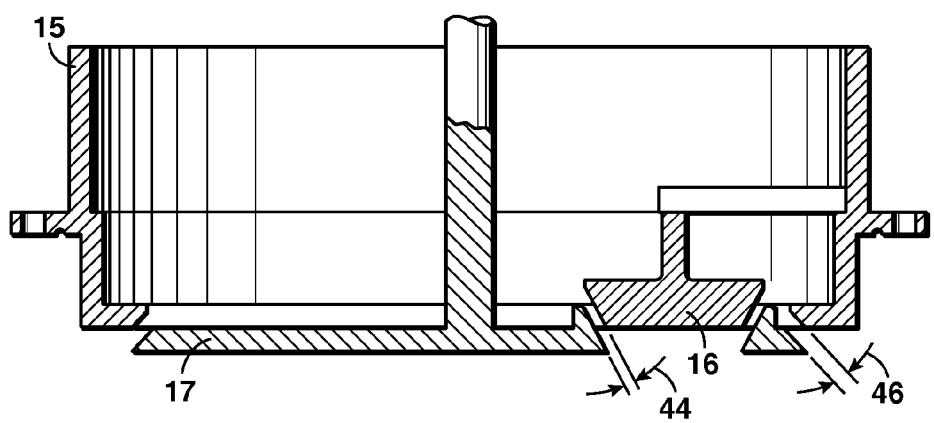
FIG. 12c hereof is a cross-sectional view along a vertical plane of a preferred poppet valve assembly of the present invention, but with the valve body cut-away to show the poppet valve in a fully open position.

The valve ports of the present invention may open or close at the same instant or may be designed to fully open or fully close with a delay feature. The valve port seat of the delayed port can have a longer taper angle, causing the port to fully open after the shorter taper has reached its limit. This feature is illustrated in FIGS. 12*a*, 12*b*, and 12*c* hereof. In this example, the dynamic valve ports between the static valve 16 and the dynamic poppet valve 17 have a longer taper angle A in FIG. 12*a* as compared to the lesser angle B for the port between the dynamic poppet valve 17 and the valve body 15.

Starting from the fully closed position, as shown in FIG. 12*a*, the dynamic poppet valve 17 is opened by actuating the stem out of the valve body (increasing the openings 40, 42, 44, and 46, as shown in the figure). After the dynamic poppet valve moves incrementally downward, the difference in flow areas is seen in FIG. 12*b*, where the opening 40 is only slightly open while the opening 42 around the outer circumference is open to a greater extent. As a result, flow through the curtain area associated with static valve 16 is delayed relative to flow around the outer circumference of the dynamic poppet valve 17. When the dynamic poppet valve is fully open, as in FIG. 12*c*, full flow is achieved through all ports, such as openings 44 and 46. The use of this feature is advantageous in cases that require complex flow regimes without having to provide additional valves.

Further, the assembled apparatus of the present invention having a valve actuator system can be strategically positioned onto a: pressure vessel, process conduit, power producing engine or any mechanical embodiment that requires a compact, high throughput poppet valve service.

In certain embodiments, the poppet valve assemblies may include various components. The poppet valve assembly may comprise a dynamic stem element, or rod, extending to a location outside the poppet valve head. The dynamic stem may be surrounded by a bushing and/or valve guide, which provides support of the valve while allowing movement along a linear path to guide and, in some cases, seals the valve during operation. In some embodiments, a valve stem seal is associated with the valve stem, e.g., rod packing as is typically utilized in reciprocating compressors. For present purposes, in some instances a valve stem seal can be the same as a bushing or valve guide, although a separate valve seal is less susceptible to wear in use.

In addition, the dynamic poppet valve may comprise a plurality of ports within the poppet valve head or disk element connected to a dynamic valve stem. The poppet valve head has a surface facing the adsorbent bed and another surface that is attached to the stem, which are on opposite sides of the poppet valve head. The surface of the poppet valve head can be substantially round, for seating in a substantially round opening or port. For present purposes, the term "substantially round" can include ellipsoidal shapes, such as those found in certain high performance engines. This surface can also be flat or profiled. In certain embodiments wherein the poppet valve head may have a surface that is profiled inward or outwardly relative to the opening on which it operates. Also, as noted above, the poppet valve may include a variety of other geometries, as well. In addition, the poppet valve assembly may include a valve body along with static valves. These static vales may be cast as part of the valve body or may be coupled to the valve body by welding, screws, bolts or other suitable means. Further, the static valves may include a stem and static valve head attached to the stem. While the static valve head may be substantially flat in certain configurations, it may include various angles of tapering from the edges of the valve to a location along the stem. The dynamic poppet valve may also include this type of configuration for certain embodiments, as well. This type of configuration may be beneficial to disperse the pressure applied directly on the static valve head.

The present invention can better be understood with reference to the following example that is presented for illustrative purposes and not to be taken as limiting the invention.

EXAMPLE

In this example, poppet valve assemblies of the present invention illustrated for the swing adsorption vessel as shown in FIGS. 10 and 11 are compared to conventional poppet valve assemblies. For the swing adsorption cycle in this example, seven independent process streams are utilized with various conditions and compositions. In this example, one poppet valve assembly is required for each of the seven process streams 50-56 as shown in FIG. 10. To provide the equivalent curtain area for each process stream using conventional poppet valves, thirty poppet valve assemblies and mechanical actuators are required as shown in FIG. 13a. In this example, the individual poppet valve ports 60 have a diameter of 4 inches and are spaced evenly across the head 62 in rows which correspond to the respective process streams 50-56. Minimum spacing between the rows 64 and between ports within a row 66 is limited by the structural integrity of the head 62. The tight spacing between the large number of poppet valves requires complex actuator assemblies 68 shown in FIG. 13a and also FIG. 13b (which is based on FIG. 13a as shown by line AA). To accommodate interconnections with various conduits 70, 72, long actuator assemblies are required, extending to a significant height 74 above the vessel.

Table 1 below summarizes these results, indicating the reduction in number of valves and the reduction in overall valve surface area.

TABLE 1

| Process Stream | Number of Valves | | Surface Area | | % Reduction |
| --- | --- | --- | --- | --- | --- |
| | Conventional | Example | Conventional | Example | |
| 50 | 3 | 1 | 37.7 sq. in | 37.1 sq. in | 1.6% |
| 51 | 4 | 1 | 50.3 sq. in | 28.5 sq. in | 43.4% |
| 52 | 5 | 1 | 62.8 sq. in | 28.4 sq. in | 54.8% |
| 53 | 6 | 1 | 75.4 sq. in | 37.8 sq. in | 49.9% |
| 54 | 5 | 1 | 62.8 sq. in | 28.4 sq. in | 54.8% |
| 55 | 4 | 1 | 50.3 sq. in | 28.5 sq. in | 43.4% |
| 56 | 3 | 1 | 37.7 sq. in | 37.1 sq. in | 1.6% |

Certain benefits of the present invention are described in this example. The increased flow area provided through a single valve body is increased significantly compared to a conventional poppet valve. As a result, fewer poppet valve assemblies are required, providing the following benefits: decreasing the number of penetrations through the vessel head, decreasing the number of actuators, decreasing the number of interconnections with associated conduits, decreasing the number of attachment points to the vessel head, and decreasing the height of associated actuators extending above or below the process vessel. Structural integrity of the process vessel head is also improved relative to conventional poppet valves because the distance between adjacent valve penetrations is increased. Furthermore, the valve surface drag is decreased significantly as a result of the reduction in the total surface area of each poppet valve head. As discussed previously, the reduced valve surface drag results in reduced load on the poppet valve stem and actuator, improving reliability and design considerations.

The provided poppet valves described above are useful in swing adsorption processes, apparatus, and systems for development and production of hydrocarbons, such as gas and oil processing. Particularly, the provided processes, apparatus, and systems are useful for the rapid, large scale, efficient separation of a variety of target gases from gas mixtures. Non-limiting swing adsorption processes include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes such as pressure/temperature swing adsorption.

PSA processes rely on the phenomenon of gases being more readily adsorbed within the pore structure or free volume of an adsorbent material when the gas is under pressure, i.e., the higher the gas pressure, the greater the amount readily-adsorbed gas adsorbed. When the pressure is reduced, the adsorbed component is released, or desorbed.

PSA processes may be used to separate gases of a gas mixture because different gases tend to fill the micropore of the adsorbent to different extents. If a gas mixture, such as natural gas, is passed under pressure through a vessel containing a polymeric or microporous adsorbent that is more selective towards carbon dioxide than it is for methane, at least a portion of the carbon dioxide is selectively adsorbed by the adsorbent, and the gas exiting the vessel is enriched in methane. When the adsorbent reaches the end of its capacity to adsorb carbon dioxide, it is regenerated by reducing the pressure, thereby releasing the adsorbed carbon dioxide. The adsorbent is then typically purged and repressurized and ready for another adsorption cycle.

TSA processes rely on the phenomenon that gases at lower temperatures are more readily adsorbed within the pore structure or free volume of an adsorbent material compared to higher temperatures, i.e., when the temperature of the adsorbent is increased, the adsorbed gas is released, or desorbed. By cyclically swinging the temperature of an adsorbent bed, TSA processes can be used to separate gases in a mixture when used with an adsorbent that is selective for one or more of the components of a gas mixture.

Swing adsorption processes typically take place in a vessel containing one or more adsorbent beds. In multi-bed systems each bed may undergo a different step in an adsorption cycle, such as an adsorption step, one or more depressurization/desorption steps, one or more blow-down steps, and one or more re-pressurization steps. The flow of fluid to and from each bed is typically controlled by either a poppet valve and/or a rotary valve assembly.

The provided processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 vol. % $CO_2$, 4 ppm $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology becomes increasingly important as remaining gas reserves exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. %

$CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

In each of these processes, one or more poppet valve assemblies may be utilized together, with one or more poppet valves providing the flow path for a first fluid, while other poppet valve assemblies provide a flow path for a second fluid. That is, different groups of poppet valve assemblies may be utilized for different streams. For example, a swing adsorbent vessel may include a first group of poppet valve assemblies and a second group of poppet valve assemblies. The first group of poppet valve assemblies may include one or more poppet feed valve assemblies at a first end of a swing adsorption vessel, one or more product poppet valve assemblies at a second end of the swing adsorption vessel, and a contractor disposed between the first and second ends. The second group of poppet valve assemblies may include one or more sweep poppet valve assemblies at a first end of a swing adsorption vessel, one or more waste poppet valve assemblies at a second end of the swing adsorption vessel. In this configuration, the different poppet valves may be utilize to manage the flow of fluids through various steps of a process. These various streams may be introduced using additional sets of the conduits, manifold and the like.

Figure 14:
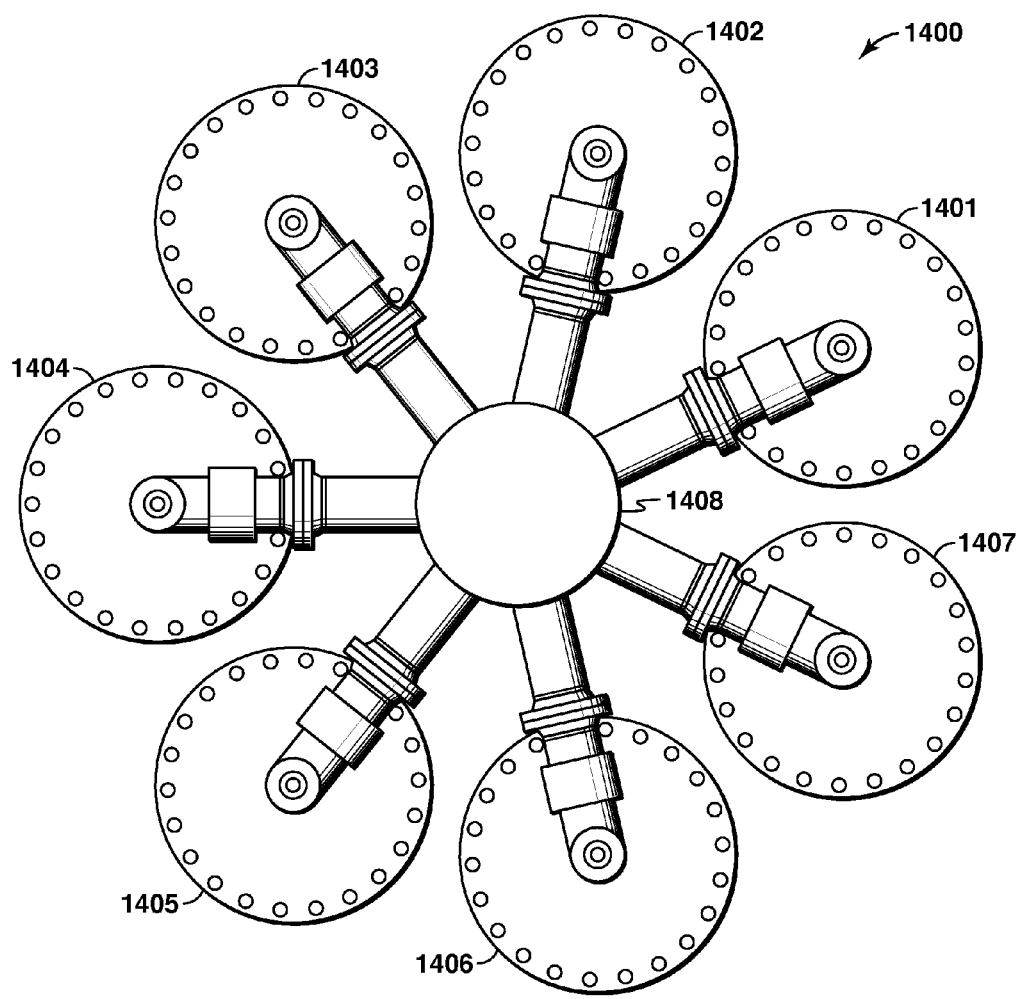
FIG. 14 is an illustration of an elevation view of an exemplary hydrocarbon treating apparatus comprised of a swing adsorption system with 14 adsorbent bed assemblies arranged in two levels of seven beds equally spaced around the central valve and flow distribution assembly.
Figure 15:
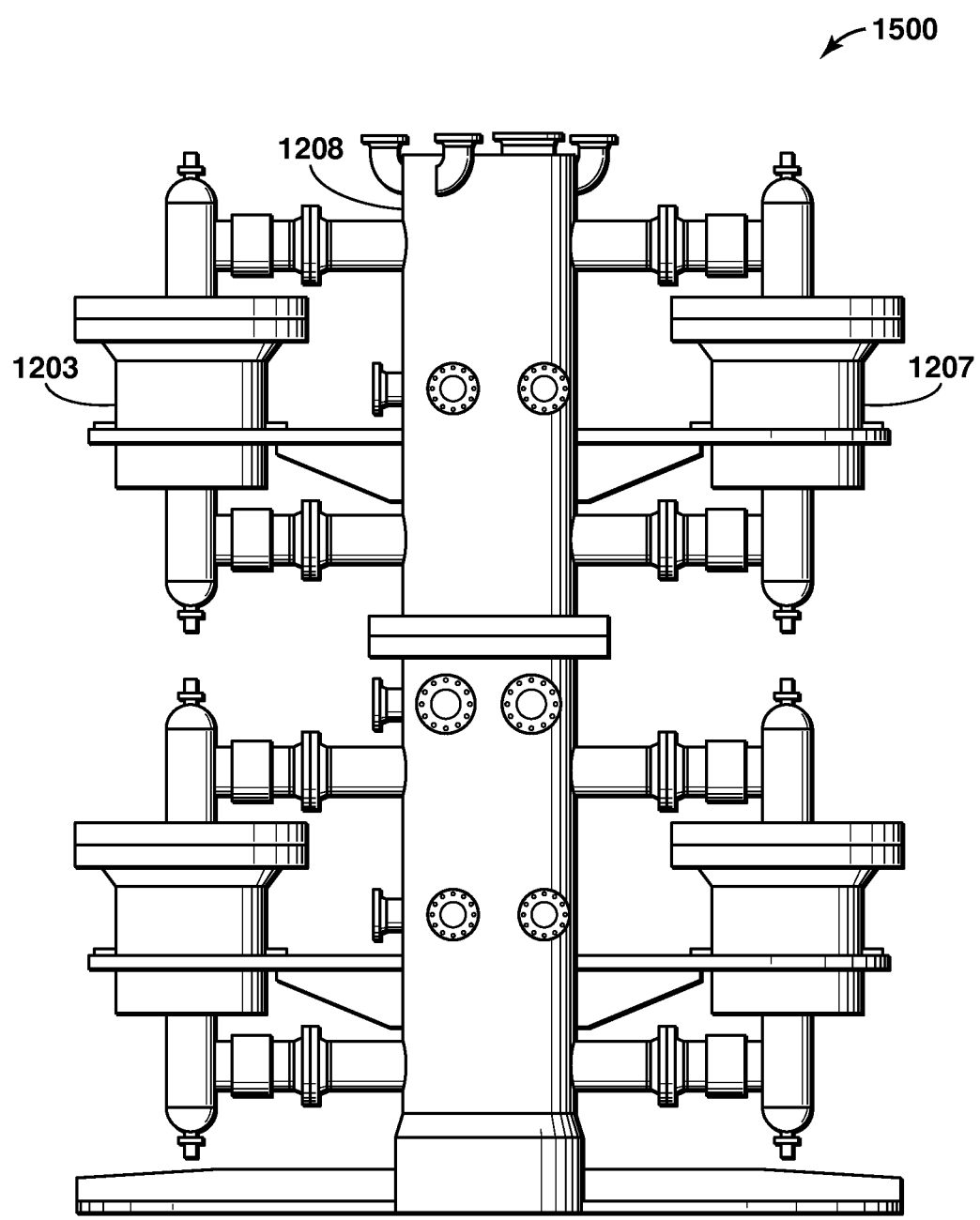
FIG. 15 is an illustration of a plan view of an exemplary hydrocarbon treating apparatus comprised of a swing adsorption system with 14 adsorbent bed assemblies arranged in two levels of seven beds equally spaced around the central valve and flow distribution assembly.

An exemplary hydrocarbon treating apparatus is shown in FIGS. 14 and 15. FIG. 14 is a top view of the swing adsorption system 1400, while FIG. 15 is a partial side view of the swing adsorption system 1500 with certain adsorbent bed assemblies omitted for simplicity. This apparatus is a compact swing adsorption system 1400 with fourteen adsorbent bed assemblies. The fourteen adsorbent bed assemblies are stacked two layers with the top adsorbent bed assemblies 1401-1407 being illustrated in FIG. 14. A rotary valve assembly 1408 is concentrically located in a cylindrical housing with a rotary valve, which is positioned equidistant to the enjoined adsorbent bed assemblies. The cylindrical housing further acts as a means of supporting a plurality of such adsorbent bed assemblies, conduits and valves in a multi-tier level arrangement. Gaseous streams are transferred through a given adsorbent bed by way of both the central rotary valve and one or more reciprocating valves located on the vessel heads. The gaseous stream has bi-directional travel between the ports of either of the reciprocating or rotary valves through a fixed conduit. The transfer duration of subsequent gaseous streams is limited and directed by the predetermined adsorption cycle.

Another feature of the apparatus shown in FIGS. 14 and 15 relates to a method of coordinating the activation mechanism of the reciprocating valve to either open or close at several predetermined physical locations on the rotary valve itself In the present embodiment, a reliable and repeatable means of replicating precise operable coordination between the open or closed ports of the respective valves is provided for the adsorption cycle. This embodiment uses a traveling magnet assigned as a transmitter location, which is aligned to a fixed magnetic assigned as a receiving location. A generated flux signal between the magnets activates a specified mechanized driver of a given reciprocating valve for a specified duration. The art of generating and reading the change in a magnetic flux signal is scientifically recognized as the Hall Effect. The hydrocarbon treating apparatus shown in FIGS. 14 and 15 can be implemented in many different configurations.

Figure 16:
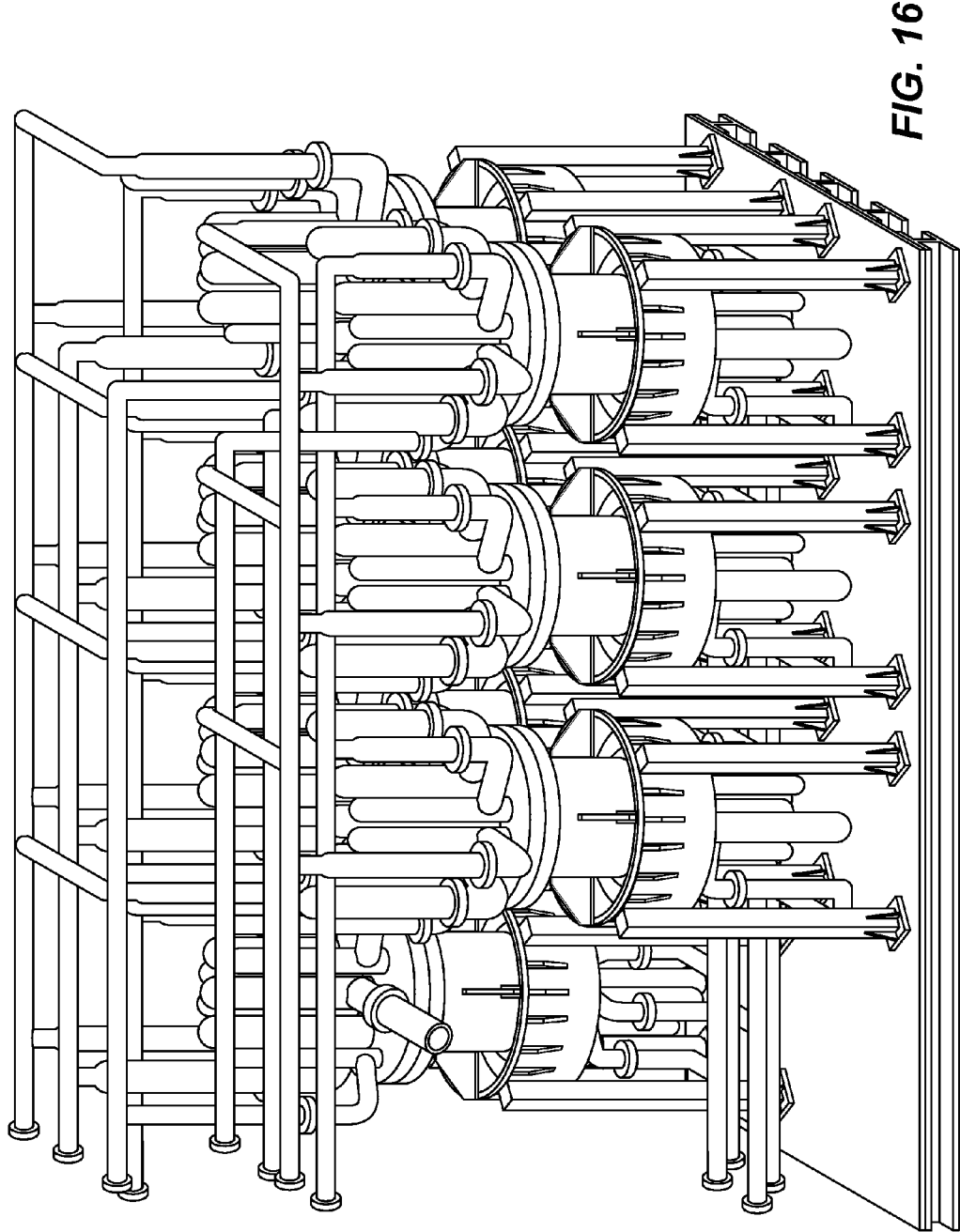
FIG. 16 is a three-dimensional diagram of another exemplary hydrocarbon treating apparatus comprised of a swing adsorption system with seven adsorbent bed assemblies arranged in two rows.

One possible alternative embodiment is shown in FIGS. 16, 17A, 17B, 17C, 18, 19A, 19B and 19C. In this embodiment, the fourteen individual adsorbent bed assemblies may be arranged in two skids, each of the skids containing seven of the individual adsorbent bed assemblies arranged in two rows. One of the exemplary skids is shown in FIG. 16. Multiple reciprocating (or poppet) valves are arranged on the top and bottom of each vessel and connected via piping and headers above and below the adsorbent bed assemblies.

Figure 17A:
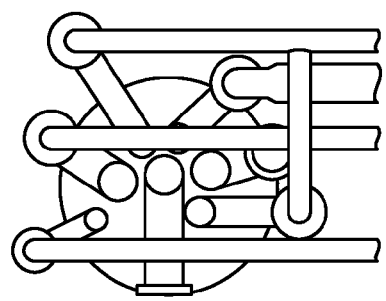
FIGS. 17a, 17b, and 17c are top, side, and bottom views, respectively, of an individual adsorbent bed assembly from the exemplary hydrocarbon treating apparatus in FIG. 16.
Figure 17B:
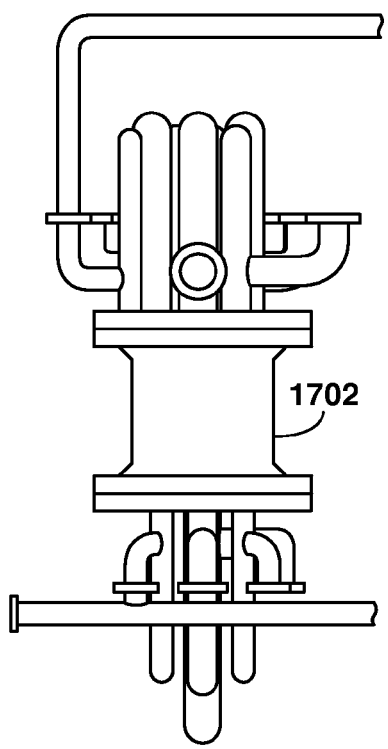
Figure 17C:
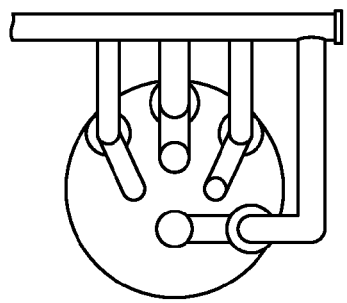

An individual adsorbent bed assembly is shown in FIGS. 17A-17C. As shown in the side view of FIG. 17B, various feed piping may pass the gaseous feed stream to the adsorbent bed assembly 1702 and the product stream may be removed via the bottom piping. The feed gas enters and exhaust gas exits through the piping and valves on the top of the vessel as shown in the top view of FIG. 17A. Product gas exits the adsorbent vessel through one of the valves and piping systems on the bottom of the vessel as shown in the bottom view in FIG. 17C. Other equalization and purge valves and piping are also included in FIGS. 17A-17C.

Figure 18:
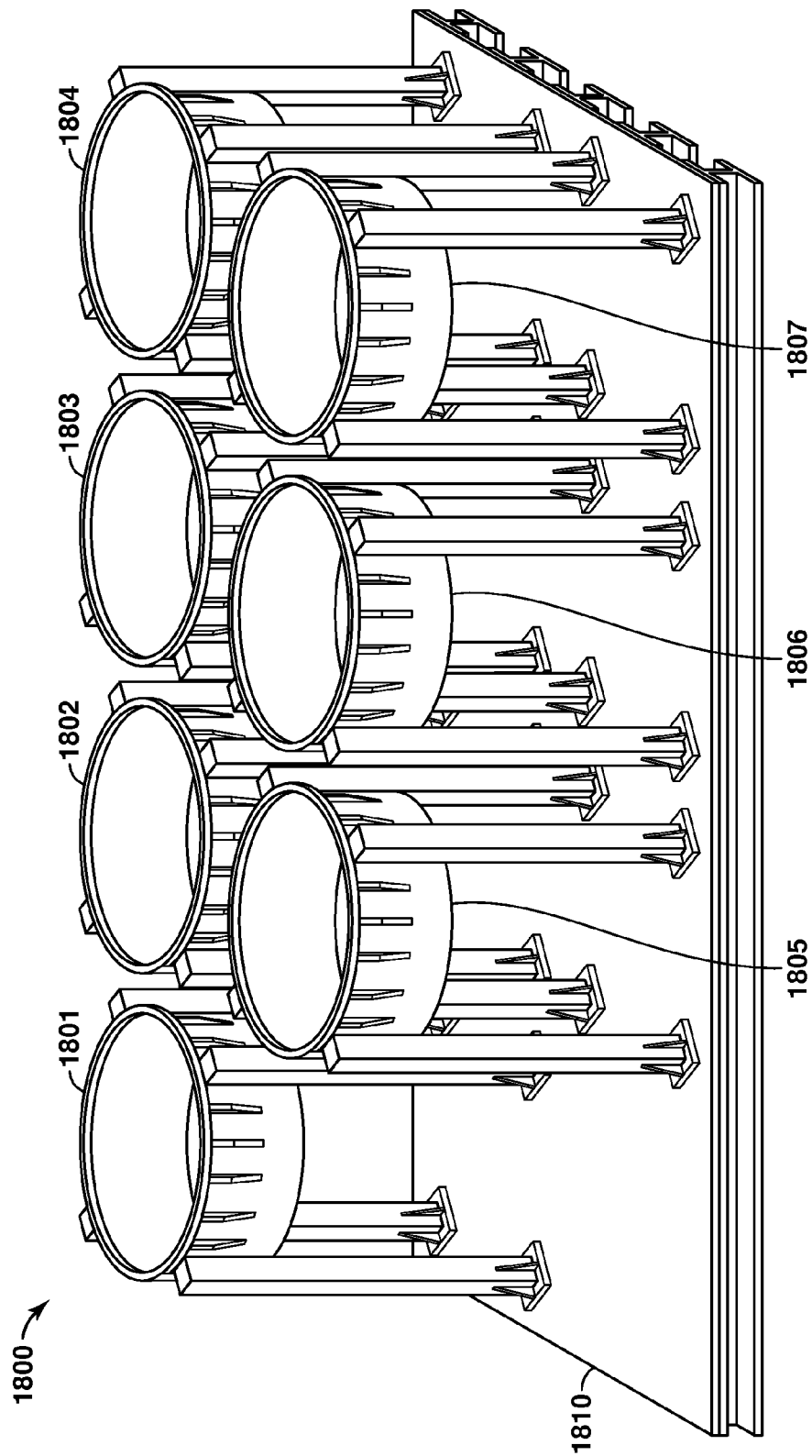
FIG. 18 is a three-dimensional diagram of individual adsorbent bed support structures attached to the skid base for the exemplary hydrocarbon treating apparatus of FIG. 16.

Each adsorbent bed assembly can be first fitted with the requisite reciprocating valves and then placed in the bed support structure 1801-1807 mounted on the skid 1810, which is shown in FIG. 18. Once the seven adsorbent bed assemblies are set in their respective support structure 1801-1807, the bed assemblies can be interconnected via piping and headers. The bed support structures 1801-1807 may be configured to permit movement to allow for thermal expansion or contraction of the piping system associated with the bed assembly. While the individual bed support structures 1801-1807 are fixed to the skid base 1810, the adsorbent bed assemblies, which are noted in other figures, may be disposed into the bed support structure 1801-1807 without being rigidly attached or securely fixed. Therefore, the entire adsorbent bed assembly can move freely within the bed support structure to accommodate thermal expansion or contraction of the piping and minimize stresses on the piping and valves.

Figure 19A:
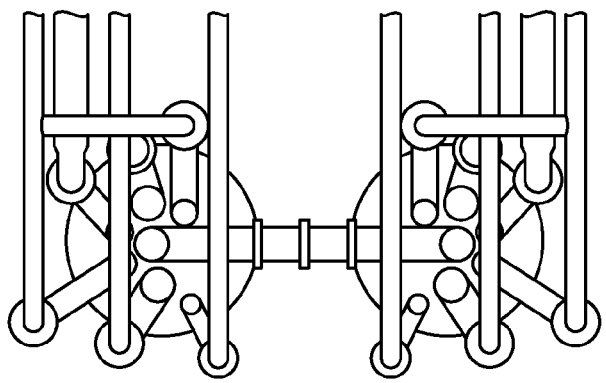
FIGS. 19a, 19b, and 19c are top, side, and bottom views, respectively, of a pair of individual adsorbent bed assemblies with interconnecting piping and bed support structures for the exemplary hydrocarbon treating apparatus in FIG. 16.
Figure 19B:
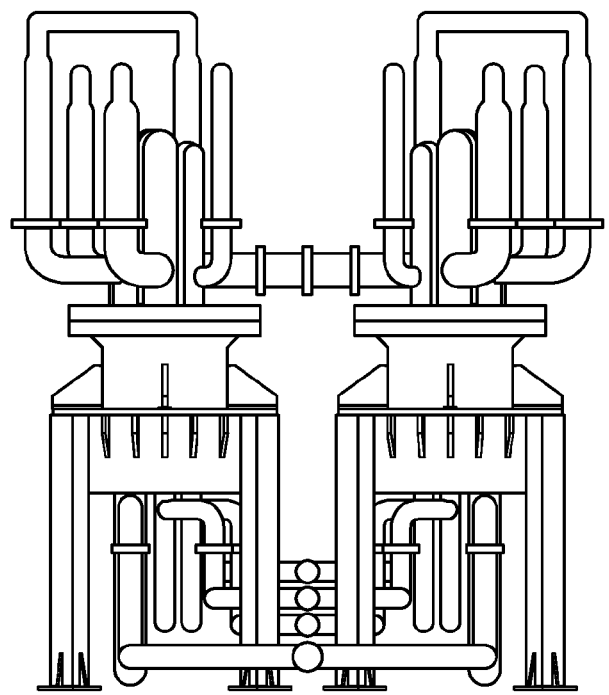
Figure 19C:
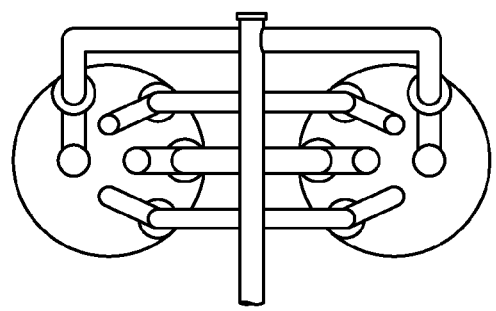

FIGS. 19A-19C provides different views of two bed assemblies. For instance, a top view of two interconnected beds is shown in FIG. 19A, a bottom view of two interconnected bed assemblies is shown in FIG. 19C, and a side view of the interconnected bed assemblies in the support structure is shown in FIG. 19B.

Figure 20:
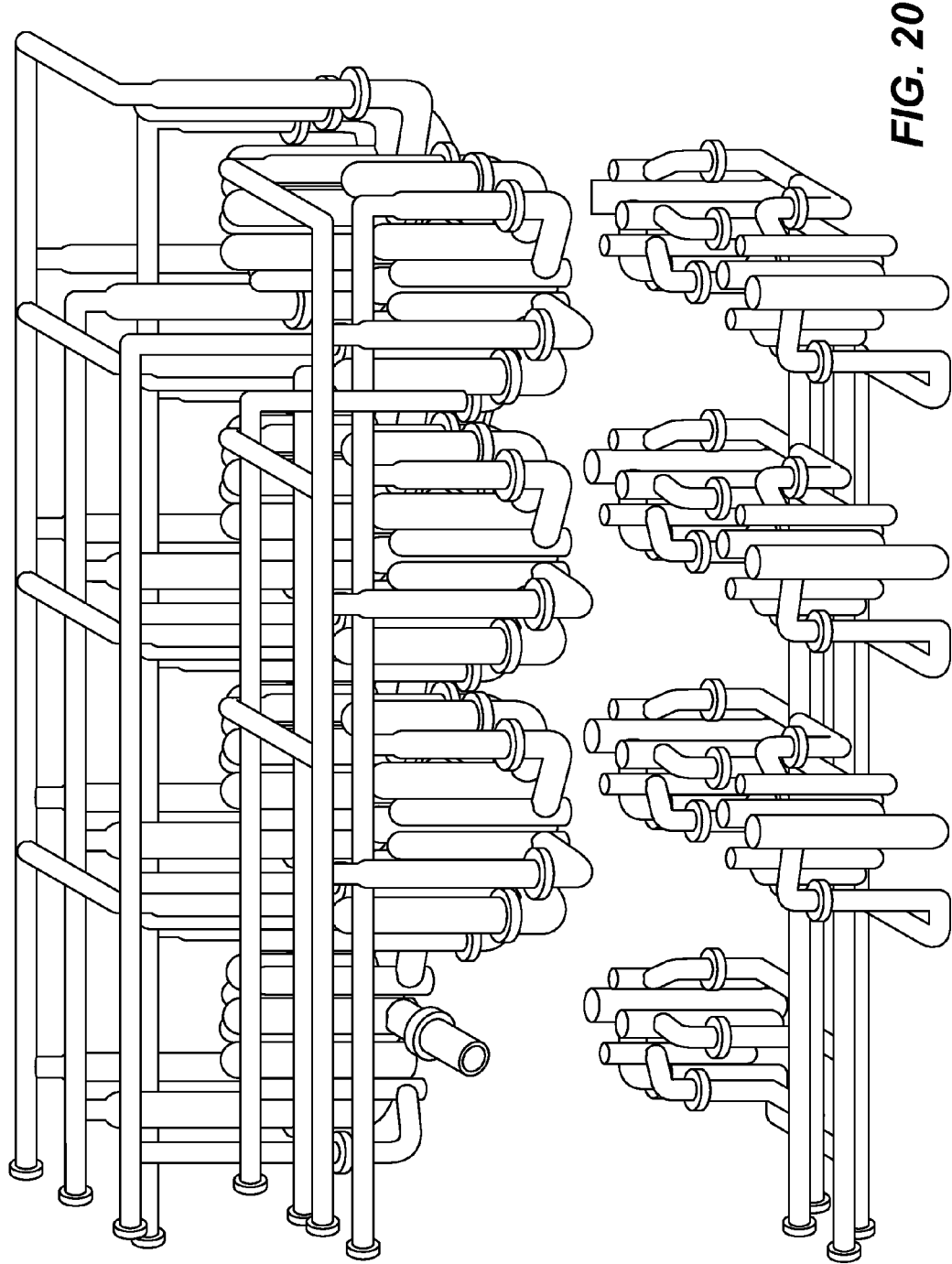
FIG. 20 is a three-dimensional diagram of the valves and piping network for the seven interconnected adsorbent beds of the exemplary hydrocarbon treating apparatus of FIG. 16.

The piping, valves, and headers for a complete skid as connected are shown in FIG. 20 without the adsorbent bed assemblies or support structure to illustrate the piping network. The top piping and headers 2001 are shown relative to the bottom piping and headers 2002 in this embodiment. The piping can be designed to be self-supporting, or additional structure can be provided to support the piping network within the skid.

One or more of the following Concepts A-O may be utilized with the processes, apparatus, and systems, provided above, to prepare a desirable product stream while maintaining high hydrocarbon recovery:

Concept A: using one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Patent Application Publication Nos. 2008/0282892, 2008/0282887, 2008/0282886, 2008/0282885, and 2008/0282884 which are each herein incorporated by reference in its entirety;

Concept B: removing acid gas with RC-TSA using advanced cycles and purges as described in U.S. patent application no. 61/447848, filed Mar. 1, 2011, which is herein incorporated by reference in its entirety;

Concept C: using a mesopore filler to reduce the amount of trapped methane in the adsorbent and increase the overall hydrocarbon recovery, as described in U.S. Patent Application Publication Nos. 2008/0282892, 2008/0282885, 2008/028286, each of which is herein incorporated by reference in its entirety. The non-sweepable void space present within the adsorbent channel wall is can be defined by the total volume occupied by mesopores and macropores. Mesopores are defined by the IUPAC to be pores with sizes in the 20 to 500 angstrom size range. Macropores are defined herein to be pores with sizes greater than 500 angstrom and less than 1 micron. Because the flow channels are larger than 1 micron in size, they are not considered to be part of the macropore volume. The non-sweepable void space is defined herein as the open pore volume occupied by pores in the absorbent that are between 20 angstroms and 10,000 angstroms (1 micron) in diameter divided by the total volume of the contactor that is occupied by the absorbent material including associated mesopores and macropores in the absorbent structure. The non-sweepable void space can be reduced by filling the mesopores and macropores between the particles to reduce the open volume while allowing rapid gas transport throughout the adsorbent layer. This filling of the non-sweepable void space, which may be referred to as mesopore filling, is desired to reduce to acceptable levels the quantity of desired product, lost during the rapid desorption step as well as to allow a high degree of adsorbent bed purity following desorption. Such mesopore filling can be accomplished in a variety of ways. For example, a polymer filler can be used with rapid diffusion of $H_2S$ and $CO_2$, such as a silicon rubber or a polymer with intrinsic porosity. Alternatively, a pyrolitic carbon having mesoporosity and/or microporosity could be used to fill the void space. Still another way is by filling the void space with inert solids of smaller and smaller sizes, or by filling the void space with a replenishable liquid through which the desired gases rapidly diffuse (such as water, solvents, or oil). Preferably, the void space within the adsorbent wall is reduced to less than about 40 volume percent (vol. %), preferably to less than 30 vol. %, and more preferably to less than 20 vol. %, and even more preferably to less than 10 vol. % and most preferably less than about 5 vol. % of the open pore volume.;

Concept D: Choosing an appropriate adsorbent materials to provide high selectivity and minimize adsorption (and losses) of methane and other hydrocarbons, such as one or more of the zeolites described in U.S. Patent Application Publication Nos. 2008/0282887 and 2009/0211441, each of which is herein incorporated by reference in its entirety. Preferred adsorbents for the removal of acid gases are selected from a group consisting of mesoporous or microporous materials, with or without functionality for chemical reactions with acid gases. Examples of materials without functionality include cationic zeolites and stannosilicates. Functionalized materials that chemically react with $H_2S$ and $CO_2$ exhibit significantly increased selectivity for $H_2S$ and $CO_2$ over hydrocarbons. Furthermore, they do not catalyze undesirable reactions with hydrocarbons that may occur on acidic zeolites. Functionalized mesoporous adsorbents are also preferred, wherein their affinity toward hydrocarbons is further reduced compared to unfunctionalized smaller pore materials, such as zeolites.

Alternatively, adsorption of heavy hydrocarbons can be kinetically suppressed by using small-pore functionalized materials, in which diffusion of heavy hydrocarbons is slow compared to $H_2S$ and $CO_2$. Care should also be taken to reduce condensation of hydrocarbons with carbon contents equal to or above about 4 (i.e., $C_4+$ hydrocarbons) on external surfaces of $H_2S$ and $CO_2$ selective adsorbents.

Non-limiting example of functional groups suitable for use herein include primary, secondary, tertiary and other non-protogenic, basic groups such as amidines, guanidines and biguanides. Furthermore, these materials can be functionalized with two or more types of functional groups. To obtain substantially complete removal of $H_2S$ and $CO_2$ from natural gas streams, an adsorbent material preferably is selective for $H_2S$ and $CO_2$ but has a low capacity for both methane and heavier hydrocarbons ($C_2+$). In one or more embodiments, it is preferred to use amines, supported on silica based or other supports because they have strong adsorption isotherms for acid gas species. They also have high capacities for such species, and as a consequence of their high heats of adsorption, they have a relatively strong temperature response (i.e. when sufficiently heated they readily desorb $H_2S$ and $CO_2$ and can thus be used without excessive temperature swings). Preferred are adsorbents that adsorb in the 25° C. to 70° C. range and desorb in the 90° C. to 140° C. range. In systems requiring different adsorbents for $CO_2$ and $H_2S$ removal, a layered bed comprising a suitable adsorbent for the targeted species may be desirable For $CO_2$ removal from natural gas, it is preferred to formulate the adsorbent with a specific class of 8-ring zeolite materials that has a kinetic selectivity. The kinetic selectivity of this class of 8-ring zeolite materials allows $CO_2$ to be rapidly transmitted into zeolite crystals while hindering the transport of methane so that it is possible to selectively separate $CO_2$ from a mixture of $CO_2$ and methane. For the removal of $CO_2$ from natural gas, this specific class of 8-ring zeolite materials preferably has a Si/Al ratio from about 1 to about 25. In other preferred embodiments, the Si/Al ratio of the zeolite material is from 2 to about 1000, preferably from about 10 to about 500, and more preferably from about 50 to about 300. It should be noted that as used herein, the term Si/Al is defined as the molar ratio of silica to alumina of the zeolitic structure. This preferred class of 8-ring zeolites that are suitable for use herein allow $CO_2$ to access the internal pore structure through 8-ring windows in a manner such that the ratio of single component diffusion coefficients for $CO_2$ over methane (i.e., $DCO_2/DCH_4$) is greater than 10, preferably greater than about 50, and more preferably greater than about 100 and even more preferably greater than 200.

In many instances, nitrogen also has to be removed from natural gas or gas associated with the production of oil to obtain high recovery of a purified methane product from nitrogen containing gas. There have been very few molecular sieve sorbents with significant equilibrium or kinetic selectivity for nitrogen separation from methane. For $N_2$ separation from natural gas it is also preferred to formulate the adsorbent with a class of 8-ring zeolite materials that has a kinetic selectivity. The kinetic selectivity of this class of 8-ring materials allows $N_2$ to be rapidly transmitted into zeolite crystals while hindering the transport of methane so that it is possible to selectively separate $N_2$ from a mixture of $N_2$ and methane. For the removal of $N_2$ from natural gas, this specific class of 8-ring zeolite materials also has a Si/Al ratio from about 2 to about 1000, preferably from about 10 to about 500, and more preferably from about 50 to about 300. This preferred class of 8-ring zeolites that are suitable for use herein allow $N_2$ to access the internal pore structure through 8-ring windows in a manner such that the ratio of single component diffusion coefficients for $N_2$ over methane (i.e., $DN_2/DCH_4$) is greater than 5, preferably greater than about 20, and more preferably greater than about 50 and even more preferably greater than 100. Resistance to fouling in swing adsorption processes during the removal $N_2$ from natural gas is another advantage offered by this class of 8-ring zeolite materials.

In a preferred embodiment, $H_2S$ is selectively removed with a non-aqueous sorbent comprising a basic non-protogenic nitrogenous compound supported on a marcroporous, mesoporous, or microporous solid. The non-protogenic nitrogenous compound selectively reacts with at least a portion of the $H_2S$ in the feed gas mixture. Examples of suitable porous solid supports include activated charcoal or solid oxides (including mixed oxides), such as alumina, silica, silica-alumina or acidic or non-acidic zeolites. The basic non-protogenic nitrogenous compound may simply be physically sorbed on the support material (e.g. by impregnation or bonded with or grafted onto it by chemical reaction with the base itself or a precursor or derivative in which a substituent group provides the site for reaction with the support material in order to anchor the sorbent species onto the support). Bonding is not, however, required for an effective solid phase sorbent material. Support materials which contain reactive surface groups, such as the silanol groups found on zeolites and the M41S silica oxides are capable of reacting with siloxane groups in compounds, such as trimethoxysilylpropyldimethylamine Non-protogenic nitrogenous compounds do not enter into chemisorption reactions with $CO_2$ in the absence of water although they do undergo reaction with $H_2S$. This differential chemical reactivity is used to make the separation between the $H_2S$ and the $CO_2$. A wide variety of basic nitrogen-containing compounds may be used as the essential sorbent. If desired, a combination of such compounds may be used. The requirement for the desired selectivity for $H_2S$ adsorption is that the nitrogenous groups be non-protogenic, that is, incapable of acting as a proton donor. The nitrogenous groups therefore do not contain an acidic, dissociable hydrogen atom, such as nitrogen in a primary or secondary amine It is not required that the whole compound be aprotic, only that the nitrogen-containing groups in the compound be non-protogenic. Non-protogenic nitrogen species cannot donate an $H^+$ (proton), which is a prerequisite for the formation of carbamates as a route for the $CO_2$ chemisorption reaction in the absence of water; they are non-nucleophilic under the prevailing reaction conditions. Suitable nitrogenous compounds include tertiary amines such as triethylamine, triethanolamine (TEA), methyldiethanolamine (MDEA), N-methyl diethanolamine ($CH_3N(C_2H_4OH)_2$), NNN'N'-tetrakis(2-hydroxyethyl)ethylenediamine as well as non-protogenic nitrogenous bases with cyclic, multicyclic, and acyclic structures, such as imines, heterocyclic imines and amines, amidines (carboxamidines) such as dimethylamidine, guanidines, triazabicyclodecenes, imidazolines, and pyrimidines. Compounds such as the N,N-di(lower alkyl)carboxamidines where lower alkyl is preferably $C_1$-$C_6$ alkyl, N-methyltetrahydropyrimidine (MTHP), 1,8-diazabicyclo[5.4.0]-undece-7-ene (DBU), 1,5,7-triazabicyclo[4.4.0] dec-5-ene (TBD), 7-methyl-1,5,7-triazabicyclo[4.4.0]dec-5-ene (MTBD), 1,5-diazabicyclo[4.3.0]non-5-ene (DBN), substituted guanidines of the formula $(R^1R^2N)(R^3R^4N)C=N-R^5$ where $R^1$, $R^2$, $R^3$ and $R^4$ are preferably lower alkyl ($C_1$-$C_6$) and $R^5$ is preferably H or lower alkyl ($C_1$-$C_6$), such as 1,1,3,3-tetramethylguanidine and biguanide, may also be used. Other substituent groups on these compounds such as higher alkyl, cycloalkyl, aryl, alkenyl, and substituted alkyl and other structures may also be used.

Another class of materials that is capable of removing $H_2S$ and $CO_2$ from natural gas streams is cationic zeolites. Selectivity of these materials for $H_2S$ and $CO_2$ depends on the framework structure, choice of cation, and the Si/Al ratio. In a preferred embodiment the Si/Al ratio for cationic materials is in a range from 1 to 50 and more preferably a range from 1 to 10. Examples of cationic zeolite include zeolites, 4A, 5A and faujasites (Y and X). It is preferred to use these materials for selectively removing $H_2S$ and $CO_2$ after the feed stream has been dehydrated.

Other non-limiting examples of preferred selective adsorbent materials for use in embodiments herein include microporous materials such as zeolites, AlPOs, SAPOs, MOFs (metal organic frameworks), ZIFs (zeolitic imidazolate frameworks, such as ZIF-7, ZIF-8, ZIF-22, etc.) and carbons, as well as mesoporous materials such as the amine functionalized MCM materials. For the acidic gases such as hydrogen sulfide and carbon dioxide which are typically found in natural gas streams, adsorbent such as cationic zeolites, amine-functionalized mesoporous materials, stannosilicates, carbons are also preferred;

Concept E: depressurizing one or more RC-PSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor(s) to optimize the overall compression system;

Concept F: using exhaust or recycle streams to minimize processing and hydrocarbon losses, such as using exhaust streams from one or more RC-PSA units as fuel gas instead of re-injecting or venting;

Concept G: using multiple adsorbent materials in a single bed to remove trace amounts of a first contaminant, such as $H_2S$, before removal of a second contaminant, such as $CO_2$; such segmented beds may provide rigorous acid gas removal down to ppm levels with RC-PSA units with minimal purge flow rates;

Concept H: using feed compression before one or more RC-PSA units to achieve a desired product purity;

Concept I: contemporaneous removal of non-acid gas contaminants such as mercaptans, COS, and BTEX; selection processes and materials to accomplish the same;

Concept J: using structured adsorbents for gas-solid contactors to minimize pressure drop compared to conventional packed beds;

Concept K: selecting a cycle time and cycle steps based on adsorbent material kinetics;

Concept L: using a process and apparatus that uses, among other equipment, two RC-PSA units in series, wherein the first RC-PSA unit cleans a feed stream down to a desired product purity and the second RC-PSA unit cleans the exhaust from the first unit to capture methane and maintain high hydrocarbon recovery; use of this series design may reduce the need for a mesopore filler;

Concept M: using parallel channel contactors, wherein gas/solid contacting takes place in relatively small diameter adsorbent lined channels. This structure of the contactor provides the benefits of rapid adsorption kinetics through minimization of gas film resistance and high gas solid communication. A preferred adsorber design generates a sharp adsorption front.

It is preferred to have very rapid gas to adsorbent kinetics, i.e. the length through which the target species (e.g., target gas) diffuses to make contact with the adsorbent wall is kept short, preferably less than 1000 microns, more preferably less than 200 microns, and most preferably less than 100 microns. Favorable adsorbent kinetics may be realized by, while limiting bed pressure drop to acceptable values, utilizing parallel channel contactors wherein the feed and purge gases are confined to a plurality of very narrow (1000 to 30 micron diameter) open channels that are lined to an effective thickness of the adsorbent material.

By "effective thicknesses" we mean a range of about 500 microns to 5 microns for most applications. In the most limiting case of laminar gas flow, the very narrow channels limit the maximum diffusion distance for a trace species to no more than half (½) the diameter of the channel. Even when adsorbing the desired species at the leading edge of the adsorption front, where their concentrations approach zero in the gas phase, a sharp adsorption front can be maintained by using such small diameter parallel channel structured adsorption bed configurations. Such a configuration can be in the form of multiple independent parallel channels, or in the form of very wide, very short channels as may be achieved by using a spiral wound design.

Concept N: A means for rapidly heating and cooling the adsorbent bed structure so that adsorption can occur at a lower temperature and desorption at a higher temperature. The adsorption step then occurs at high pressure and the higher temperature desorption step can optionally take place at a reduced pressure in order to increase adsorbent swing capacity. Depending upon adsorbent properties, it may be desirable to use a bed architecture suitable for either an externally temperature controlled or internally temperature controlled scheme.

By "internal temperature control" we mean the use of a heating and cooling fluid media, either gaseous or liquid, preferably liquid, that can be circulated through the same adsorbent lined channels that are utilized for the gaseous feed flow. Internal temperature control requires that the adsorbent material not be adversely affected by the temperature control fluid and that the temperature control fluid be easily separated from the previously adsorbed species ($H_2S$ and $CO_2$) following the heating step. Further, for internal temperature control, the pressure drop across each of the parallel channels in the structured bed during the gaseous feed adsorption step is preferably sufficiently high to clear each channel (or the single channel in the case of spiral wound designs) of the temperature control fluid. Additionally, internal fluid flow temperature designs preferably utilize an adsorbent that does not strongly adsorb the temperature control fluid so that $H_2S$ and $CO_2$ may be usefully adsorbed even in the presence of the temperature control fluid.

Non-limiting examples of such adsorbents include amine functionalized microporous and mesoporous adsorbents. A non-limiting example of such a system may be the use of supported amines on a water stable support with the use of hot and cold water (pressurized liquid or used as steam for heating) for heating and cooling. Whereas liquid water may be left within the adsorbent wall during the adsorption step, if the thickness of the adsorbent wall is kept small (less than 1000 microns, preferably less than 200 microns, and most preferably less than 100 microns) it may be possible for $H_2S$ and $CO_2$ to diffuse through the liquid water in time scales less than 1 minute, more preferred less than 10 seconds to become adsorbed by the supported amine Following the desorption step, $H_2S$ and $CO_2$ can be easily separated using distillation or other methods known to those skilled in the art.

By "external temperature control" we mean an adsorbent bed structure where the heating and cooling fluid is kept from contact with the gas carrying adsorbent channels. Such a structure can resemble a tube and shell heat exchanger, plate and frame heat exchanger or hollow fibers with a fluid impermeable barrier layer on the outer diameter or on the inner diameter, or any other suitable structures. In order to obtain rapid heating and cooling, the distance through which the heat diffuses from the temperature control fluid to the adsorbent layer should be kept to a minimum, ideally less than 10,000 microns, more preferably less than 1000 microns, most preferably less than 200 microns.

A non-limiting example of such an external temperature control bed design may be the use of hollow fibers with a fluid impermeable barrier layer on the outer diameter wherein the hollow fibers are comprised of a mixed matrix system of polymeric and supported amine adsorbents. Feed gas may be passed through the inner diameter of the porous fiber to be adsorbed by the adsorbent at lower temperatures, while cool temperature control fluid is flowing over the fibers outer diameters. Desorption may be accomplished by passing hot temperature control fluid, preferably in a counter-current direction over the fibers outer diameter, thus heating the adsorbent. The cycle is completed by exchanging the hot temperature control fluid with cold fluid to return the fiber containing the adsorbent to the desired adsorption temperature.

In a preferred embodiment, the rate of heat flow in the system is such that a sharp temperature gradient in the temperature control fluid is established during heating and cooling such that the sensible heat of the system can be recuperated within the adsorbent bed structure. For such a non-limiting hollow fiber example, the useful fiber outer diameter dimension is less than 20,000 microns, preferably less than 2000 microns, and most preferably less than 1000 microns. The useful hollow fiber inner diameters (the feed gas channels) is less than 10,000 microns, preferably less than 1000 microns, and most preferably less than 500 microns as suitable based on the desired adsorption and desorption cycle times, feed adsorbed species concentrations, and adsorbent layer swing capacity for those species.

In one or embodiments, it is advantageous to keep the ratio of non-adsorbing thermal mass in the adsorbent bed to adsorbent as low as possible. This ratio is preferably be less than 20, more preferably less than 10, and most preferred less than 5. In this manner, the sensible heat of the system that is swung in each cycle may be kept to a minimum;

Concept O: A relatively low flow of about 0.01 to 5 vol. % of the total feed of a clean gas substantially free of $H_2S$ or $CO_2$ is utilized as a purge gas. Non-limiting examples of such gases (i.e., "clean gas") include methane and nitrogen that are maintained flowing through the parallel channels in a direction counter-current to the feed direction during at least a portion of the desorption steps of the process. It is preferred that the flow rate of this clean gas be sufficient to overcome the natural diffusion of the desorbing $H_2S$ and $CO_2$ to maintain the product end of the adsorbing channel in a substantially clean condition. That is, the purge stream should have sufficient flow rate to sweep the desorbing $CO_2$ and $H_2S$ from the channels and/or pores. It is this counter-current purge flow during desorption that ensures that on each subsequent adsorption cycle there is no breakthrough of target species, such as $H_2S$ or $CO_2$ into the product stream. A further benefit or objective of the clean purge is to assist in desorption of contaminants by reducing the partial pressure of contaminants in the flow channels of the adsorbent bed. This lessening of the partial pressure may be utilized to drive the contaminants from the adsorbent bed.

A preferred cycle and bed design for the practice of the present invention is that the product end of the adsorbent channels, (i.e. the end opposite the end where feed gases enter) have a low, or ideally essentially zero concentration of adsorbed $H_2S$ and $CO_2$. In this manner, and with suitable structured channels as described above, the $H_2S$ and $CO_2$ are rigorously removed from the feed gas stream. The downstream end of the bed can be kept clean as described by maintaining a low flow of a clean fluid substantially free of $H_2S$ and $CO_2$, in a counter-current direction relative to the feed direction, during the desorption step(s), or more preferably, during all the heating and cooling steps in the cycle. It is further preferred that during the adsorption step, the adsorption part of the cycle be limited to a time such that the advancing adsorption front of $H_2S$ and $CO_2$ loaded adsorbent not reach the end of the channels, i.e. adsorption to be halted prior to $H_2S$ and/or $CO_2$ breakthrough so that a substantially clean section of the adsorbent channel remains substantially free of target species. With reasonably sharp adsorption fronts, this allows more than 50 vol. % of the adsorbent to be utilized, more preferred more than 75 vol. %, and most preferred more than 85 vol. %.

The processes, apparatus, and systems provided herein are useful in large gas treating facilities, such as facilities that process more than five million standard cubic feet per day (MSCFD) of natural gas, or more than 15 MSCFD of natural gas, or more than 25 MSCFD of natural gas, or more than 50 MSCFD of natural gas, or more than 100 MSCFD of natural gas, or more than 500 MSCFD of natural gas, or more than one billion standard cubic feet per day (BSCFD) of natural gas, or more than two BSCFD of natural gas.

Compared to conventional technology, the provided processes, apparatus, and systems require lower capital investment, lower operating cost, and less physical space, thereby enabling implementation offshore and in remote locations, such as Arctic environments. The provided processes, apparatus, and systems provide the foregoing benefits while providing high hydrocarbon recovery as compared to conventional technology.

Additional embodiments A-S are provided as follows:
Embodiment A: A poppet valve assembly comprising:
 a valve body;
 a plurality of static valves fixedly secured to the valve body;
 a single dynamic poppet valve having a plurality of openings, wherein the plurality of static valves align and mate with the plurality of openings, the single dynamic poppet valve reciprocates to selectively open and close the plurality of static valves.
Embodiment B: The poppet valve assembly of Embodiment A, wherein the valve body has an inside wall having at least one flow vane protruding inwardly therefrom.
Embodiment C: The poppet valve assembly of Embodiment A or B, wherein the single dynamic poppet valve has a vane disposed between two of the openings.
Embodiment D: The poppet valve assembly of Embodiment A or B, wherein the single dynamic poppet valve has a vane disposed between each of the openings.
Embodiment E: The poppet valve assembly of any of Embodiments A-D, wherein the openings have a circular cross-section.
Embodiment F: The poppet valve assembly of any of Embodiments A-D, wherein the openings have a non-circular cross-section.
Embodiment G1: A swing adsorption vessel comprising:
 a plurality of adsorbent beds;
 a plurality of poppet valves, each of the plurality of adsorbent beds being in fluid communication with only one of the plurality of poppet valves, each poppet valve comprising:
 a valve body;
 a plurality of static valves fixedly secured to the valve body;
 a single dynamic poppet valve having a plurality of openings, wherein the plurality of static valves align and mate with the plurality of openings, the single dynamic poppet valve reciprocates to selectively open and close the plurality of static valves.
Embodiment G2: A swing adsorption vessel comprising:
 one or more adsorbent beds;
 a plurality of poppet valve assemblies, each of the plurality of poppet valve assemblies being in fluid communication with the one or more adsorbent beds, each poppet valve assembly comprising:
 a valve body;
 a plurality of static valves fixedly secured to the valve body;
 a single dynamic poppet valve having a plurality of openings, wherein the plurality of static valves align and mate with the plurality of openings, the single dynamic poppet valve reciprocates to selectively open and close the plurality of static valves.
Embodiment H: The swing adsorption vessel of any one of Embodiment G1 and G2, wherein the valve body has an inside wall, the inside wall having at least one flow vane protruding inwardly therefrom.
Embodiment I: The swing adsorption vessel of Embodiment G1, G2 or H, wherein the single dynamic poppet valve has a vane disposed between two of the openings.
Embodiment J: The swing adsorption vessel of Embodiment G1, G2 or H, wherein the single dynamic poppet valve has a vane disposed between each of the openings.
Embodiment K: The swing adsorption vessel of any of Embodiments G1-J, wherein the openings have a circular cross-section.
Embodiment L: The swing adsorption vessel of any of Embodiments G1-J, wherein the openings have a non-circular cross-section.
Embodiment M: A method of processing hydrocarbons comprising the steps of:
 (a) providing an apparatus comprising the poppet valve assembly of any of embodiments A-F, (b) recovering at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment N: The method of Embodiment M, wherein one or more additional steps utilize a kinetic swing adsorption process selected from the group consisting of: pressure swing adsorption (PSA), thermal swing adsorption (TSA), calcination, partial pressure swing or displacement purge adsorption (PPSA), and combinations of these processes.

Embodiment O: The method of Embodiment N, wherein one or more swing adsorption process utilizes rapid cycles.

Embodiment P: The method of an of Embodiments M-O, wherein a gaseous feed stream is processed to achieve: (a) a desired dew point, (b) a desired level of detoxification, (c) a desired corrosion protection composition, (d) a desired dehydration level, (e) a desired gas heating value, (f) a desired purification level, or (g) combinations thereof.

Embodiment Q: A hydrocarbon treating apparatus comprising:
an apparatus comprising the poppet valve of any of embodiments A-F or shown in the attached figures, wherein the hydrocarbon treating apparatus capacity is at least 5 million, or at least 15 million, or at least 25 million, or at least 50 million, or at least 100 million, or at least 500 million, or at least 1 billion, or at least 2 billion standard cubic feet per day (SCFD) of natural gas.

Embodiment R: The poppet valve assembly according to any of the Embodiment A-Q or below in paragraphs 1-16, wherein the single dynamic poppet valve has a first chamfer and at least one of the static valves has a second chamfer, the first chamfer and second chamfer configured to delay the flow through one of the respective openings formed by the movement of the dynamic poppet valve.

Embodiment S: The poppet valve assembly according to any of the Embodiment A-Q or below in paragraphs 1-16, further comprising a shock absorber disposed within the valve body and configured to absorb the contact force for one or more of the dynamic poppet valve and the static valves. The shock absorber may be coupled to the valve body and/or may be a portion of the stem for the static valve or dynamic valve.

Additional embodiments 1-16 are provided in the following paragraphs:

1. A poppet valve assembly comprising: a valve body; a plurality of static valves fixed in a single orientation relative to the valve body; a single dynamic poppet valve having a stem coupled to a poppet valve head, wherein the poppet valve head has a plurality of ports with each port aligned to mate with one of the plurality of static valves, the stem being capable of axial movement to (i) provide a fluid flow path through the plurality of ports between the valve body and a location external to the valve body, and (ii) prevent fluid flow through the plurality of openings between the valve body and a location external to the valve body.

2. The poppet valve assembly according to paragraph 1, wherein each of the static valves has a static valve head coupled to a stem, the inside wall having at least one flow vane protruding inwardly therefrom.

3. The poppet valve assembly according to paragraph 1, wherein the single dynamic poppet valve has a vane disposed between two of the openings.

4. The poppet valve assembly according to paragraph 3, wherein the valve body has an inside wall, the inside wall having at least one flow vane protruding inwardly therefrom.

5. The poppet valve assembly according to paragraph 3, wherein the single dynamic poppet valve has a vane disposed between each of the openings.

6. The poppet valve assembly according to paragraph 5, wherein the valve body has an inside wall, the inside wall having at least one flow vane protruding inwardly therefrom.

7. The poppet valve assembly according to paragraph 1, wherein the openings have a circular cross-section.

8. The poppet valve assembly according to paragraph 1, wherein the openings have a non-circular cross-section.

9. A swing adsorption vessel comprising: a housing defining an interior region, one or more adsorbent beds disposed within the housing; a plurality of poppet valve assemblies coupled to the housing, each of the plurality of poppet valve assemblies comprising a valve body; a plurality of static valves fixed in a single orientation relative to the valve body; a single dynamic poppet valve having a stem coupled to a poppet valve head, wherein the poppet valve head has a plurality of ports with each port aligned to mate with one of the plurality of static valves, the stem being capable of axial movement to (i) provide a fluid flow path through the plurality of ports between the one or more adsorbent beds and a location external to the housing, and (ii) prevent fluid flow through the plurality of ports between the one or more adsorbent beds and a location external to the housing.

10. The swing adsorption vessel according to paragraph 9, wherein the valve body has an inside wall, the inside wall having at least one flow vane protruding inwardly therefrom.

11. The swing adsorption vessel according to paragraph 9, wherein the single dynamic poppet valve has a vane disposed between two of the openings.

12. The swing adsorption vessel according to paragraph 11, wherein the valve body has an inside wall, the inside wall having at least one flow vane protruding inwardly therefrom.

13. The swing adsorption vessel according to paragraph 11, wherein the single dynamic poppet valve has a first chamfer and at least one of the static valves has a second chamfer, the first chamfer and second chamfer configured to delay the flow through one of the respective openings formed by the movement of the dynamic poppet valve.

14. The swing adsorption vessel according to paragraph 11, further comprising a shock absorber disposed within the valve body and configured to absorb the contact force for one or more of the dynamic poppet valve and the static valves.

15. The swing adsorption vessel according to paragraph 9, wherein the openings have a circular cross-section.

16. The swing adsorption vessel according to paragraph 9, wherein the openings have a non-circular cross-section.

In view of the many possible embodiments to which the principles of the disclosed invention may be applied, it should be recognized that the illustrative embodiments are only preferred examples of the invention and should not be taken as limiting the scope of the invention.

I claim:

1. A swing adsorption vessel comprising: a housing defining an interior region, one or more adsorbent beds disposed within the housing; a plurality of poppet valve assemblies coupled to the housing, each of the plurality of poppet valve assemblies comprising a valve body; a plurality of static valves fixed in a single orientation relative to the valve body; a single dynamic poppet valve having a stem coupled to a poppet valve head, wherein the poppet valve head has a plurality of ports with each port aligned to mate with one of the plurality of static valves, the stem being capable of axial movement to (i) provide a fluid flow path through the plurality of ports between the one or more adsorbent beds and a location external to the housing, and (ii) prevent fluid flow through the plurality of ports between the one or more adsorbent beds and a location external to the housing.

2. The swing adsorption vessel according to claim 1, wherein the valve body has an inside wall, the inside wall having at least one flow vane protruding inwardly therefrom.

3. The swing adsorption vessel according to claim 1, wherein the single dynamic poppet valve has a vane disposed between two of the ports and coupled between the stem and the poppet valve head.

4. The swing adsorption vessel according to claim 3, wherein the valve body has an inside wall, the inside wall having at least one flow vane protruding inwardly therefrom.

5. The swing adsorption vessel according to claim 1, wherein the single dynamic poppet valve has a first chamfer and at least one of the static valves has a second chamfer, the first chamfer and second chamfer configured to delay the flow through one of the respective openings formed by the movement of the dynamic poppet valve.

6. The swing adsorption vessel according to claim 5, further comprising a shock absorber disposed within the valve body and configured to absorb the contact force for one or more of the dynamic poppet valve and the static valves.

7. The swing adsorption vessel according to claim 1, wherein the openings have a circular cross-section.

8. The swing adsorption vessel according to claim 1, wherein the openings have a non-circular cross-section.

* * * * *